(12) United States Patent
Pflug

(10) Patent No.: US 11,689,703 B2
(45) Date of Patent: Jun. 27, 2023

(54) VEHICULAR VISION SYSTEM WITH CUSTOMIZED DISPLAY

(71) Applicant: MAGNA ELECTRONICS INC., Auburn Hills, MI (US)

(72) Inventor: Goerg Pflug, Weil der Stadt (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/444,207

(22) Filed: Aug. 2, 2021

(65) Prior Publication Data

US 2021/0360217 A1 Nov. 18, 2021

Related U.S. Application Data

(63) Continuation of application No. 16/747,023, filed on Jan. 20, 2020, now Pat. No. 11,082,678, which is a
(Continued)

(51) Int. Cl.
*H04N 13/106* (2018.01)
*G06T 7/80* (2017.01)
(Continued)

(52) U.S. Cl.
CPC ............. *H04N 13/106* (2018.05); *G06T 7/80* (2017.01); *G06T 15/00* (2013.01); *G06T 15/20* (2013.01);
(Continued)

(58) Field of Classification Search
None
See application file for complete search history.

(56) References Cited

U.S. PATENT DOCUMENTS

| 4,961,625 A | 10/1990 | Wood et al. |
| 4,966,441 A | 10/1990 | Conner |

(Continued)

FOREIGN PATENT DOCUMENTS

| EP | 0361914 A2 | 4/1990 |
| EP | 0640903 A1 | 3/1995 |

(Continued)

OTHER PUBLICATIONS

Behringer et al., "Simultaneous Estimation of Pitch Angle and Lane Width from the Video Image of a Marked Road," pp. 966-973, Sep. 12-16, 1994.
(Continued)

*Primary Examiner* — Talha M Nawaz
(74) *Attorney, Agent, or Firm* — Honigman LLP

(57) ABSTRACT

A vehicular vision system includes a plurality of cameras and a processor operable to process image data captured by the cameras. The plurality of cameras includes a front camera, a rear camera, a driver-side camera and a passenger-side camera. Images derived from image data captured by at least some of the cameras are displayed on a display screen of the vehicle for viewing by a driver of the vehicle during a driving maneuver of the vehicle. During the driving maneuver of the vehicle, the display screen displays a three dimensional vehicle representation as would be viewed from a viewpoint exterior to the vehicle. A portion of the displayed three dimensional vehicle representation is at least partially transparent. A degree of transparency of the portion of the displayed three dimensional vehicle representation is adjustable.

23 Claims, 26 Drawing Sheets

Related U.S. Application Data continuation of application No. 16/188,137, filed on Nov. 12, 2018, now Pat. No. 10,542,244, which is a continuation of application No. 15/700,274, filed on Sep. 11, 2017, now Pat. No. 10,129,518, which is a continuation of application No. 14/362,636, filed as application No. PCT/US2012/068331 on Dec. 7, 2012, now Pat. No. 9,762,880.

(60) Provisional application No. 61/706,406, filed on Sep. 27, 2012, provisional application No. 61/615,410, filed on Mar. 26, 2012, provisional application No. 61/570,017, filed on Dec. 13, 2011, provisional application No. 61/568,791, filed on Dec. 9, 2011.

(51) Int. Cl.
  *G06T 15/00* (2011.01)
  *H04N 13/15* (2018.01)
  *G06T 15/20* (2011.01)
  *G06T 15/50* (2011.01)

(52) U.S. Cl.
  CPC ............. *G06T 15/50* (2013.01); *H04N 13/15* (2018.05); *G06T 2207/30252* (2013.01); *G06T 2207/30264* (2013.01); *G06T 2210/62* (2013.01); *G06T 2215/16* (2013.01)

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,177,606 A | 1/1993 | Koshizawa |
| 5,182,502 A | 1/1993 | Slotkowski et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,169,572 B1 | 1/2001 | Sogawa |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjonell |

(56) References Cited

U.S. PATENT DOCUMENTS

| | | | |
|---|---|---|---|
| 6,757,521 B1 * | 6/2004 | Ying | G05B 23/0272 |
| | | | 455/457 |
| 6,762,867 B2 | 7/2004 | Lippert et al. | |
| 6,795,221 B1 | 9/2004 | Urey | |
| 6,807,287 B1 | 10/2004 | Hermans | |
| 6,823,241 B2 | 11/2004 | Shirato et al. | |
| 6,824,281 B2 | 11/2004 | Schofield et al. | |
| 6,847,916 B1 * | 1/2005 | Ying | G05B 23/0208 |
| | | | 702/182 |
| 6,864,930 B2 | 3/2005 | Matsushita et al. | |
| 6,889,161 B2 | 5/2005 | Winner et al. | |
| 6,909,753 B2 | 6/2005 | Meehan et al. | |
| 6,946,978 B2 | 9/2005 | Schofield | |
| 6,968,736 B2 | 11/2005 | Lynam | |
| 6,975,775 B2 | 12/2005 | Rykowski et al. | |
| 7,004,606 B2 | 2/2006 | Schofield | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,085,637 B2 | 8/2006 | Breed et al. | |
| 7,092,548 B2 | 8/2006 | Laumeyer et al. | |
| 7,113,867 B1 | 9/2006 | Stein | |
| 7,116,246 B2 | 10/2006 | Winter et al. | |
| 7,123,168 B2 | 10/2006 | Schofield | |
| 7,133,661 B2 | 11/2006 | Hatae et al. | |
| 7,149,613 B2 | 12/2006 | Stam et al. | |
| 7,151,996 B2 | 12/2006 | Stein | |
| 7,161,616 B1 | 1/2007 | Okamoto et al. | |
| 7,167,796 B2 | 1/2007 | Taylor et al. | |
| 7,195,381 B2 | 3/2007 | Lynam et al. | |
| 7,202,776 B2 | 4/2007 | Breed | |
| 7,227,459 B2 | 6/2007 | Bos et al. | |
| 7,227,611 B2 | 6/2007 | Hull et al. | |
| 7,307,655 B1 | 12/2007 | Okamoto et al. | |
| 7,325,934 B2 | 2/2008 | Schofield et al. | |
| 7,325,935 B2 | 2/2008 | Schofield et al. | |
| 7,338,177 B2 | 3/2008 | Lynam | |
| 7,375,803 B1 | 5/2008 | Bamji | |
| 7,380,948 B2 | 6/2008 | Schofield et al. | |
| 7,388,182 B2 | 6/2008 | Schofield et al. | |
| 7,423,821 B2 | 9/2008 | Bechtel et al. | |
| 7,425,076 B2 | 9/2008 | Schofield et al. | |
| 7,526,103 B2 | 4/2009 | Schofield et al. | |
| 7,541,743 B2 | 6/2009 | Salmeen et al. | |
| 7,565,006 B2 | 7/2009 | Stam et al. | |
| 7,566,851 B2 | 7/2009 | Stein et al. | |
| 7,605,856 B2 | 10/2009 | Imoto | |
| 7,619,508 B2 | 11/2009 | Lynam et al. | |
| 7,720,580 B2 | 5/2010 | Higgins-Luthman | |
| 7,786,898 B2 | 8/2010 | Stein et al. | |
| 7,792,329 B2 | 9/2010 | Schofield et al. | |
| 7,843,451 B2 | 11/2010 | Lafon | |
| 7,855,778 B2 | 12/2010 | Yung et al. | |
| 7,881,496 B2 | 2/2011 | Camilleri et al. | |
| 7,930,160 B1 | 4/2011 | Hosagrahara et al. | |
| 7,949,486 B2 | 5/2011 | Denny et al. | |
| 8,017,898 B2 | 9/2011 | Lu et al. | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,378,851 B2 | 2/2013 | Stein et al. | |
| 8,421,865 B2 | 4/2013 | Euler et al. | |
| 8,452,055 B2 | 5/2013 | Stein et al. | |
| 8,553,088 B2 | 10/2013 | Stein et al. | |
| 9,146,898 B2 | 9/2015 | Ihlenburg et al. | |
| 9,621,768 B1 | 4/2017 | Lyon | |
| 9,762,880 B2 | 9/2017 | Pflug | |
| 10,129,518 B2 | 11/2018 | Pflug | |
| 10,542,244 B2 | 1/2020 | Pflug | |
| 11,082,678 B2 | 8/2021 | Pflug | |
| 2002/0002427 A1 | 1/2002 | Ishida et al. | |
| 2002/0005778 A1 * | 1/2002 | Breed | G02B 27/01 |
| | | | 340/436 |
| 2002/0011611 A1 | 1/2002 | Huang et al. | |
| 2002/0113873 A1 | 8/2002 | Williams | |
| 2002/0181405 A1 * | 12/2002 | Ying | H04L 43/50 |
| | | | 370/338 |
| 2003/0103142 A1 | 6/2003 | Hitomi et al. | |
| 2003/0137586 A1 | 7/2003 | Lewellen | |
| 2003/0222982 A1 | 12/2003 | Hamdan et al. | |
| 2004/0148057 A1 * | 7/2004 | Breed | G01S 7/4802 |
| | | | 700/242 |
| 2004/0164228 A1 | 8/2004 | Fogg et al. | |
| 2005/0105793 A1 * | 5/2005 | Sorek | G06T 19/006 |
| | | | 382/154 |
| 2005/0225645 A1 | 10/2005 | Kaku | |
| 2005/0237385 A1 | 10/2005 | Kosaka et al. | |
| 2006/0103727 A1 | 5/2006 | Tseng | |
| 2006/0167630 A1 * | 7/2006 | Noma | G06F 30/15 |
| | | | 701/117 |
| 2006/0200277 A1 * | 9/2006 | Yoshida | G09B 9/052 |
| | | | 701/1 |
| 2006/0250501 A1 | 11/2006 | Wildmann et al. | |
| 2006/0274147 A1 | 12/2006 | Chinomi et al. | |
| 2006/0287825 A1 | 12/2006 | Shimizu et al. | |
| 2007/0021854 A1 * | 1/2007 | Teng | G06F 30/15 |
| | | | 700/103 |
| 2007/0024724 A1 | 2/2007 | Stein et al. | |
| 2007/0025596 A1 | 2/2007 | Ravier et al. | |
| 2007/0104476 A1 | 5/2007 | Yasutomi et al. | |
| 2007/0165908 A1 | 7/2007 | Braeuni et al. | |
| 2007/0177011 A1 | 8/2007 | Lewin et al. | |
| 2007/0229310 A1 | 10/2007 | Sato | |
| 2007/0242339 A1 | 10/2007 | Bradley | |
| 2008/0043099 A1 | 2/2008 | Stein et al. | |
| 2008/0147321 A1 | 6/2008 | Howard et al. | |
| 2008/0186210 A1 * | 8/2008 | Tseng | G01C 21/365 |
| | | | 701/428 |
| 2008/0192132 A1 | 8/2008 | Bechtel et al. | |
| 2008/0231710 A1 | 9/2008 | Asari et al. | |
| 2008/0266396 A1 | 10/2008 | Stein | |
| 2009/0113509 A1 | 4/2009 | Tseng et al. | |
| 2009/0122140 A1 | 5/2009 | Imamura | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2009/0290032 A1 | 11/2009 | Zhang et al. | |
| 2010/0073359 A1 * | 3/2010 | Suddreth | G01C 23/00 |
| | | | 345/419 |
| 2010/0220189 A1 | 9/2010 | Yanagi | |
| 2010/0292868 A1 * | 11/2010 | Rotem | G05D 1/0038 |
| | | | 701/2 |
| 2010/0328060 A1 | 12/2010 | Chen et al. | |
| 2011/0069169 A1 | 3/2011 | Kadowaki et al. | |
| 2011/0175752 A1 | 7/2011 | Augst | |
| 2011/0202272 A1 * | 8/2011 | Feyereisen | G01C 23/00 |
| | | | 701/532 |
| 2011/0216201 A1 | 9/2011 | McAndrew et al. | |
| 2011/0234802 A1 | 9/2011 | Yamada et al. | |
| 2012/0045112 A1 | 2/2012 | Lundblad et al. | |
| 2012/0069185 A1 | 3/2012 | Stein | |
| 2012/0078686 A1 | 3/2012 | Bashani | |
| 2012/0087546 A1 | 4/2012 | Focke et al. | |
| 2012/0140073 A1 | 6/2012 | Ohta et al. | |
| 2012/0200707 A1 | 8/2012 | Stein et al. | |
| 2012/0221207 A1 | 8/2012 | Nakamura | |
| 2012/0262482 A1 | 10/2012 | Miwa | |
| 2012/0314071 A1 | 12/2012 | Rosenbaum et al. | |
| 2012/0320209 A1 | 12/2012 | Vico et al. | |
| 2013/0093851 A1 | 4/2013 | Yamamoto et al. | |
| 2013/0107052 A1 | 5/2013 | Gloger et al. | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0222592 A1 | 8/2013 | Gieseke | |
| 2013/0286193 A1 | 10/2013 | Pflug | |
| 2014/0043473 A1 | 2/2014 | Gupta et al. | |
| 2014/0063197 A1 | 3/2014 | Yamamoto et al. | |
| 2014/0063254 A1 | 3/2014 | Shi et al. | |

(56) References Cited

U.S. PATENT DOCUMENTS

| | | |
|---|---|---|
| 2014/0098229 A1 | 4/2014 | Lu et al. |
| 2014/0139640 A1 | 5/2014 | Shimizu |
| 2014/0152778 A1 | 6/2014 | Ihlenburg et al. |
| 2014/0152827 A1 | 6/2014 | Yamamoto et al. |
| 2014/0160284 A1 | 6/2014 | Achenbach et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0022664 A1 | 1/2015 | Pflug et al. |
| 2015/0036885 A1 | 2/2015 | Pflug et al. |
| 2015/0049193 A1 | 2/2015 | Gupta et al. |

FOREIGN PATENT DOCUMENTS

| | | |
|---|---|---|
| EP | 0697641 A2 | 2/1996 |
| EP | 1115250 A1 | 7/2001 |
| EP | 2081149 A1 | 7/2009 |
| EP | 2377094 A1 | 10/2011 |
| EP | 2667325 A1 | 11/2013 |
| GB | 2233530 A | 1/1991 |
| JP | S6216073 | 4/1987 |
| JP | 01123587 | 5/1989 |
| JP | H1168538 A | 7/1989 |
| JP | H236417 | 8/1990 |
| JP | 3099952 | 4/1991 |
| JP | 6227318 B2 | 8/1994 |
| JP | 07105496 | 4/1995 |
| JP | 2630604 | 7/1997 |
| JP | 200274339 A | 3/2002 |
| JP | 20041658 A | 1/2004 |
| JP | 2011151446 A | 8/2011 |
| WO | 1994019212 A2 | 9/1994 |
| WO | 1996038319 A2 | 12/1996 |
| WO | 2009126748 | 10/2009 |
| WO | 2010099416 A1 | 9/2010 |
| WO | 2011028686 A1 | 3/2011 |
| WO | 2012075250 A1 | 6/2012 |
| WO | 2012139636 A1 | 10/2012 |
| WO | 2012139660 A1 | 10/2012 |
| WO | 2012143036 A1 | 10/2012 |

OTHER PUBLICATIONS

Broggi et al., "Self-Calibration of a Stereo Vision System for Automotive Applications", Proceedings of the 2001 IEEE International Conference on Robotics & Automation, Seoul, KR, May 21-26, 2001.
Philomin et al., "Pedestrian Tracking from a Moving Vehicle".
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review", IEEE Conference on Intelligent Transportation Systems, 2004.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
International Search Report and Written Opinion dated Feb. 22, 2013, for corresponding PCT Application No. PCT/US2012/68331.

* cited by examiner

VEHICULAR VISION SYSTEM WITH CUSTOMIZED DISPLAY

CROSS REFERENCE TO RELATED APPLICATIONS

The present application is a continuation of U.S. patent application Ser. No. 16/747,023, filed Jan. 20, 2020, now U.S. Pat. No. 11,082,678, which is a continuation of U.S. patent application Ser. No. 16/188,137, filed Nov. 12, 2018, now U.S. Pat. No. 10,542,244, which is a continuation of U.S. patent application Ser. No. 15/700,274, filed Sep. 11, 2017, now U.S. Pat. No. 10,129,518, which is a continuation of U.S. patent application Ser. No. 14/362,636, filed Jun. 4, 2014, now U.S. Pat. No. 9,762,880, which is a 371 national phase filing of PCT Application No. PCT/US2012/068331, filed Dec. 7, 2012, which claims the filing benefit of U.S. provisional applications, Ser. No. 61/706,406, filed Sep. 27, 2012, Ser. No. 61/615,410, filed Mar. 26, 2012, Ser. No. 61/570,017, filed Dec. 13, 2011, and Ser. No. 61/568,791, filed Dec. 9, 2011, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 7,161,616; 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The system is operable to display a surround view or bird's-eye view of the environment at or around or at least partially surrounding the subject or equipped vehicle, and the displayed image includes a displayed image representation of the subject vehicle that at least partially corresponds to the actual subject vehicle, so that the driver can cognitively associate the displayed image as being representative of the driven vehicle and readily understand that the displayed vehicle represents the vehicle that he/she is driving.

According to an aspect of the present invention, a vision system for a vehicle includes multiple cameras or image sensors disposed at a vehicle and having respective fields of view exterior of the vehicle, and a processor operable to process image data captured by the camera. The processor processes captured image data to generate images, such as three dimensional images, of the environment surrounding the equipped vehicle, and the processor is operable to generate a three dimensional vehicle representation of the equipped vehicle. A display screen is operable to display the generated images of the environment surrounding the equipped vehicle and to display the three dimensional vehicle representation of the equipped vehicle as the representation would be viewed from a virtual camera viewpoint exterior to and higher than the equipped vehicle itself. At least one of (a) a degree of transparency of at least a portion of the displayed vehicle representation is adjustable, (b) the vehicle representation comprises a vector model and (c) the vehicle representation comprises at least one of (i) a shape corresponding to that of the actual equipped vehicle, (ii) a body type corresponding to that of the actual equipped vehicle, (iii) a body style corresponding to that of the actual equipped vehicle and (iv) a color corresponding to that of the actual equipped vehicle.

The vision system thus may select or adjust the displayed vehicle image or representation that is representative of the equipped vehicle to provide an enhanced display of the surrounding environment (such as by adjusting a degree of transparency or opaqueness of the displayed vehicle representation of the subject vehicle) and/or enhanced cognitive recognition by the driver of the equipped vehicle that the displayed vehicle representation represents the equipped vehicle that is being driven by the driver (such as by matching or coordinating the vehicle type or style or color or the like of the displayed vehicle representation with the actual vehicle type or style or color or the like of the actual particular subject vehicle). For example, a portion of the generated vehicle representation (such as an avatar of the vehicle or virtual vehicle or the like) may be rendered at least partially transparent or non-solid to allow "viewing through" the displayed vehicle representation to view an object at or near the vehicle that may be "blocked" by the vehicle representation, which may be between the displayed object and the virtual camera.

The present invention may also or otherwise provide a calibration system for the vision system or imaging system, which utilizes multiple cameras to capture images exterior of the vehicle, such as rearwardly and sidewardly and forwardly of the vehicle, such as for a surround view or bird's-eye view system of a vehicle. The cameras provide communication/data signals, including camera data or image data that is displayed for viewing by the driver of the vehicle and that is processed to merge the captured images from the cameras to provide or display a continuous surround view image for viewing by the driver of the vehicle. The cameras and/or image processing is calibrated to provide the continuous image or merged images. When the cameras and/or image processing is calibrated, the captured images can be stitched or merged together to provide a substantially seamless top-down view or bird's-eye view at the vehicle via capturing images and processing images captured by the vehicle cameras.

According to an aspect of the present invention, a vision system for a vehicle includes multiple cameras or image sensors disposed at a vehicle and having respective fields of view exterior of the vehicle, and a processor operable to process data transmitted by the camera. The processor comprises a camera calibration algorithm that is operable to compare captured image data of a portion of the equipped vehicle with stored or received data (such as uploaded data from a database or data received from a remote source or the like) that is representative of where the portion of the equipped vehicle should be in the captured image data for a calibrated vision system. The vision system adjusts the image processing and/or the camera so that the captured image data of the portion of the equipped vehicle is within a threshold level of where the portion of the equipped vehicle is in the stored or received data (such that the camera field of view and/or the captured image is within a threshold height, width, depth, tilt and/or rotation of the stored or received calibrated camera image).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from one or more cameras and may provide or generate a vehicle representation or image that is representative of the subject vehicle (such as for a top down or bird's-eye or surround view, such as discussed below), with the vehicle representation being customized to at least partially correspond to the actual subject vehicle, such that the displayed vehicle image or representation is at least one of the same or similar type of vehicle as the subject vehicle and the same or similar color as the subject vehicle.

Figure 1:
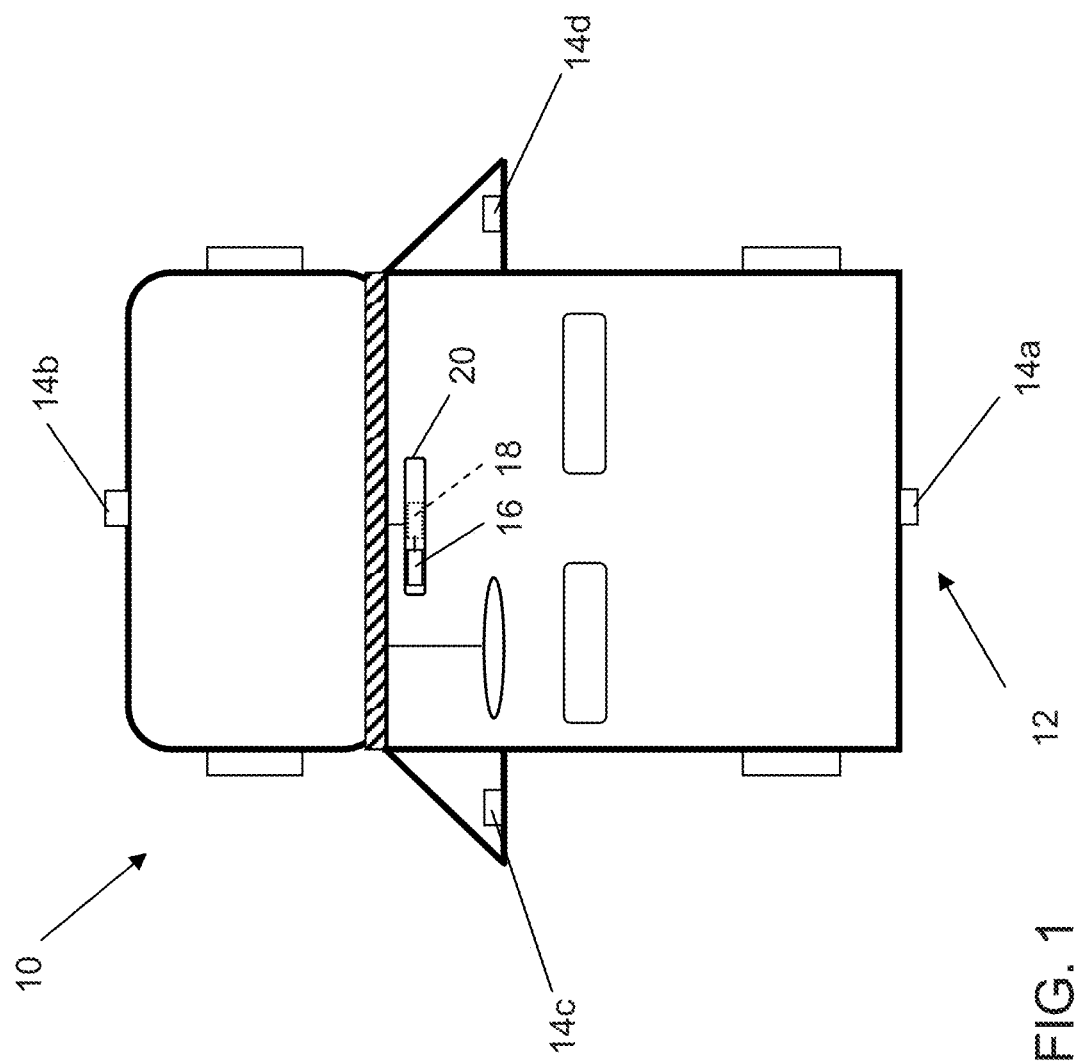
FIG. 1 is a plan view of a vehicle with a vision system and imaging sensors or cameras that provide exterior fields of view in accordance with the present invention.
Figure 2:
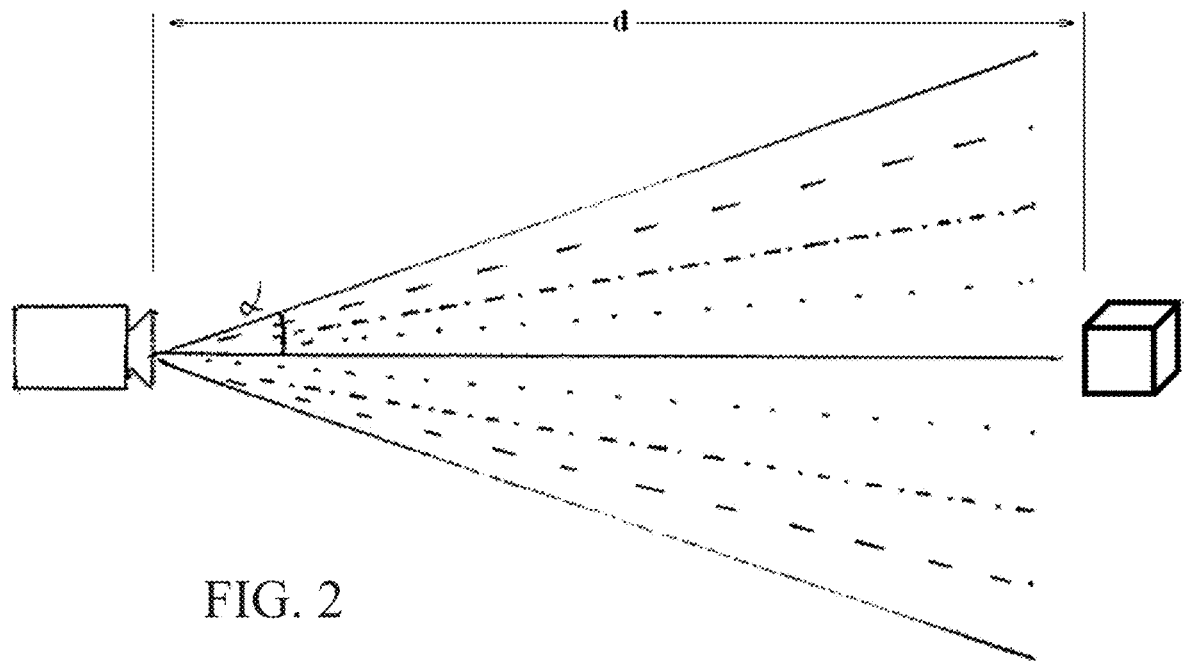
FIG. 2 is a schematic of the vision system of the present invention, showing an aberration angle α from the center viewing direction of the virtual camera and the distance to an object.
Figure 3:
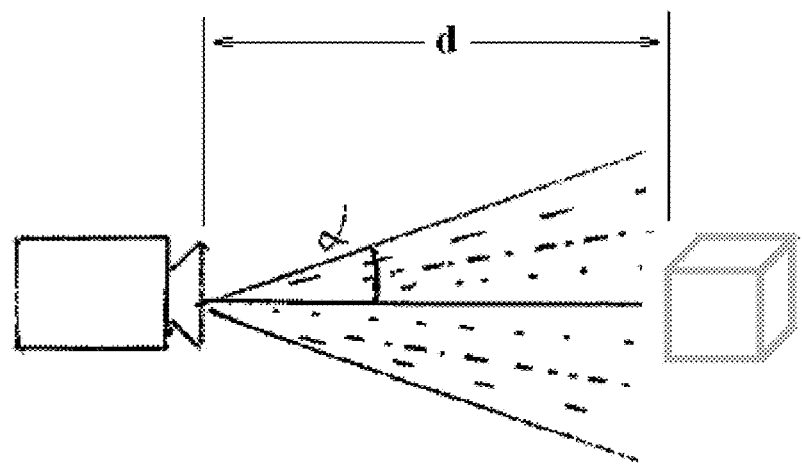
FIG. 3 is a schematic of the vision system of the present invention, showing small distances between a virtual camera and an object where the transparency is relatively high, and shown with the aberration angle α from the center viewing direction being zero.
Figure 4:
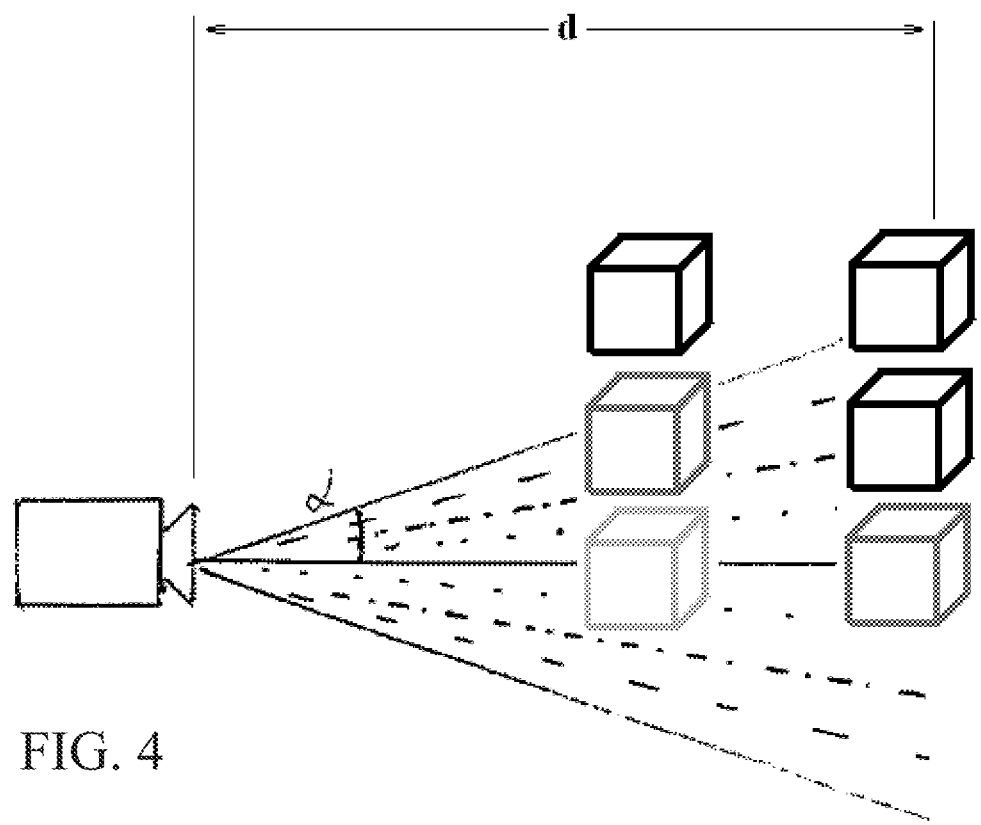
FIG. 4 is a schematic of the vision system of the present invention, showing the influence of the distance and aberration angle to the transparency of an object.
Figure 5:
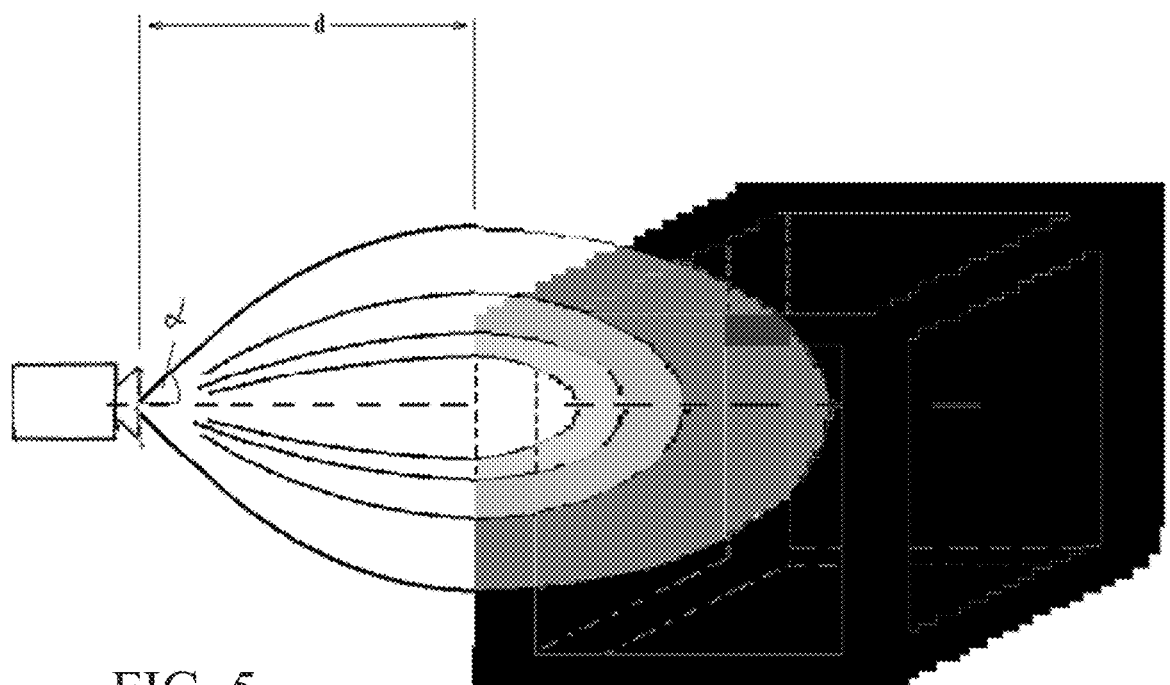
FIG. 5 is a schematic of the vision system of the present invention, showing the dependence of transparency on the distance and viewing angle resulting in a circle like opening of surfaces when a virtual camera is closing and finally diving into a virtual object or surface, especially when moving the virtual camera or viewpoint.
Figure 6:
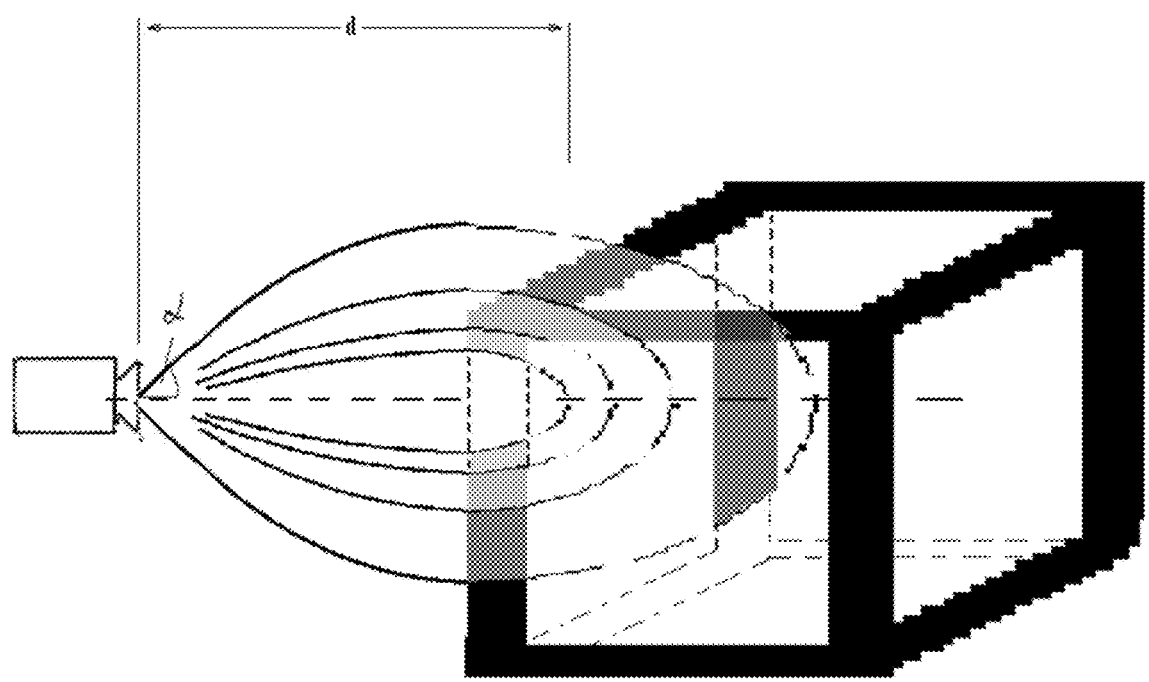
FIG. 6 is a schematic of an automotive vision camera that provides data and that is controlled from an image processing control device, with the image processing control device providing image data to a head unit or other display device.

Referring now to the drawings and the illustrative embodiments depicted therein, a vehicle 10 includes an imaging system or vision system 12 that includes multiple exterior facing imaging sensors or cameras (such as a rearward facing imaging sensor or camera 14a, and a forwardly facing camera 14b at the front (or at the windshield) of the vehicle, and a sidewardly/rearwardly facing camera 14c, 14d at respective sides of the vehicle), which capture images exterior of the vehicle, with each of the cameras having a lens for focusing images at or onto an imaging array or imaging plane of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

The vision system 12 is operable to process image data captured by the cameras and may merge or stitch the images together to provide a top view or surround view or bird's-eye view image display at a display device 16 for viewing by the driver of the vehicle (such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/064980, filed Nov. 14, 2012, and published May 23, 2013 as International Publication No. WO 2013/074604, and/or PCT Application No. PCT/US2012/048993, filed Jul. 31, 2012, and published Feb. 7, 2013 as International Publication No. WO 2013/019795, and/or PCT Application No. PCT/CA2012/000378, filed Apr. 25, 2012, and published Nov. 1, 2012 as International Publication No. WO 2012/145822, and/or U.S. patent application Ser. No. 13/333,337, filed Dec. 21, 2011, now U.S. Pat. No. 9,264,672, and/or U.S. provisional application Ser. No. 61/588,833, filed Jan. 20, 2012, which are hereby incorporated herein by reference in their entireties). Optionally, the control or processor of the vision system may process captured image data to detect objects, such as objects to the rear of the subject or equipped vehicle during a reversing maneuver, or such as approaching or following vehicles or vehicles at a side lane adjacent to the subject or equipped vehicle or the like.

Vehicle vision systems are typically made for displaying the vehicle's environment, highlighting hazards, displaying helpful information and/or enhancing the visibility. The vision systems display the images (such as video images) to the driver of the vehicle, with the images captured by cameras and sensors, which may comprise optical image sensors, infrared sensors, long and short range RADAR, LIDAR, Laser, ultrasound sensors, and/or the like. The display may be integrated into an interior rearview mirror assembly disposed inside the vehicle, or an exterior rearview mirror assembly at an exterior side portion of the vehicle, or a heads up display or other projection system that projects the visual information to any surface or surfaces for viewing by the driver, or a display unit within the instrument cluster, or a flip up display on the dashboard, or a central display or an aftermarket display which receives display data from the vehicle and/or other aftermarket sensors.

Overlays to the natural or captured image, icons or soft buttons are often useful in such vision systems. The natural or captured images may be enhanced by any algorithm or system. The images may be influenced by the situation depending state (such as similar to the systems described in U.S. patent application Ser. No. 13/660,306, filed Oct. 25, 2012, now U.S. Pat. No. 9,146,898, which is hereby incorporated herein by reference in its entirety), or the images may be enhanced by or merged with information coming from non-vision sensors, such as an infrared sensor or sensors, a radar sensor or sensors, a laser sensor or sensors, a lidar sensor or sensors, or the like, or the images may be influenced by, enhanced by or merged with data from any other data source, such as mobile devices, such as mobile phones, infotainment devices, GPS, a car to car communication device or car to infrastructure communication device or the like.

It is known to merge or stitch images captured by and coming from more than one camera or image capturing device, eventually merging or enhancing the images responsive to non-vision sensors such as discussed above. The resulting stitched images may then be displayed in a manner that the stitched or merged images form a kind of bowl or dome in the displayed image or projection (such as by utilizing aspects of the system described in Japanese publication JP2011151446A, which is hereby incorporated herein by reference in its entirety). Typically, there is an overlay of the subject vehicle placed on top the artificially generated top view. The displayed image view is as if the person viewing the displayed image is looking at the vision system's own vehicle (the subject or equipped vehicle) and seeing the environment in which the vehicle is located (such as from a virtual view point or virtual camera). The virtual view is from the outside of the vehicle and looking downward towards and onto the vehicle, and the vehicle is typically shown as disposed at the bottom of the bowl or dome. This means that a representation of the equipped vehicle is fully or partially visible in the displayed image. The view may be free positionable by a virtual camera (view-point, -angle, -focus, -shutter, -blend). The virtual camera might have a top view point, and/or may be looking at the vehicle's rooftop from an angle (and may be provided as a predetermined virtual viewpoint or may be selected or adjusted by the operator, such as via a user input in the vehicle that allows the operator to adjust the viewing angle and/or distance from the virtual camera to the equipped vehicle).

The vehicle's overlay is typically arbitrarily chosen and is not based on sensor data, but is chosen by the given parameter set up. There may be art to calibrate the camera's color room by the common color captured on some of the subject vehicle's surfaces, but the vehicle in its entirety is not covered by any sensor so the vehicle's real appearance is typically not detectable. Optionally, and such as described in U.S. provisional application Ser. No. 61/602,876, filed Feb. 24, 2012, which is hereby incorporated herein by reference in its entirety, a vision system may provide a manner of detecting the subject vehicle's total height plus baggage by using reflected images of the vehicle as reflected in a window or the like adjacent to or near the vehicle.

The displayed vehicle image (as generated by the system, and not as captured by the cameras) may be selected to be close to the shape of the equipped vehicle. Typically, the displayed vehicle image is an arbitrary or generic vehicle shape and is shown as a solid vehicle shape and drawn sharp without noise or softened borderlines.

Top view vision systems typically provide aligned images without black bars on the abutting sides. These might be stitched by any common algorithm. Typically, such systems may have a comparably small overlapping zone in which both images have a degree of transparency to smooth the stitching borderlines.

Thus, images of objects and the environment around the vehicle that are captured by the cameras and/or further sensing systems, and thus might be evident to the driver, may be hidden or partially hidden by the visualized or displayed (own or equipped) vehicle image shown in the displayed images. Known vision systems are operable to display a vehicle representation that typically does not match or correspond with the real appearance of the real or actual subject or equipped vehicle, and customers may dislike the potentially substantial differences between the actual equipped vehicle and the displayed representation of the vehicle.

In nature the surfaces of objects reflect the surrounding scene, depending on the object surfaces' reflection ratio, scattering properties of the surfaces and illumination angle. The surrounding scene's illumination brightness and color also becomes influenced by objects reflections. Known vehicle top view vision systems do not reflect most of these matters. For improving the visual reproduction or representation of the subject vehicle within its surrounding environment, the present invention may utilize the methods of Gouraud-shading, (Blin-) Phong shading (use of bidirectional reflectance distribution functions), Fast Phong shading (using texture coordinates instead of angle calculation), Bump mapping or Fast Bump mapping (a fast Phong shading based brightness control) for generating reflections or scattering on the vehicle's surfaces, especially the windshield, chrome parts and painted metal and plastic parts. The closest to a realistic reproduction of reflections may be the (spherical) "Environment mapping" method. A sphere shape image around the reflecting object is assumed. Rays from the viewpoint reflected angle correct (angle in =angle out) onto the object's surface are tracked to a respecting originating point on the sphere (part of the ray tracing formulas). The reflections may be calculated out of the images taken by the vehicle's cameras. There may be a simplified model to calculate the ray tracing since the object's (vehicle's) surface is composed out of several polygons. This may require calculating the ray tracing on its edges and to interpolate texture coordinates within the polygon. To ease the ray tracing, the undewarped original images of the fish eye cameras may be directly used as spherical environment images assuming these are mostly spherical. If the sky cannot be captured by any camera sufficiently it may be assumed according real reflections on the real vehicle's surface seen by any camera. The sun's position may be calculated out of navigation system data or assumed according to real reflections on the real vehicle's surface as seen by any camera. The reflections may be generated correctly according the surface's (such as, for example, the hood of the vehicle) curvature or in a simplified manner, so that the reflection does not represent the real world's reflections in full extend.

The present invention may also map the movement of the correct appearance or fake tires, the correct or a fake license plate, and switched on or switched off lights and blinkers. The light or the blinking may be done by positioning one or more glowing, partial, transparent polygons in front of the not engaged blinker or lights, or by animating the texture of the vehicle. The animation may be a part of at least one camera's view, and may be distorted to match correctly. The top view animation may replace the blinker indicators in the central clusters, and it may also indicate which headlight or blinker bulb is broken when there is a defect, may be by an additional icon overlay that is deployed.

The present invention may also or otherwise use three dimensional polygon models for rendering the subject vehicle projected into the scene within the top view (typically into the center of the view) in combination with bump mapping. The quality of the produced image of the vehicle improves with the number of used polygons. Higher polygon numbers (for example, at least about 10,000, more preferably at least about 20,000 and more preferably at least about 30,000 or the like) require increasingly more calculating capacities. Hence, the necessary number of used polygons shall be as minimal as acceptable. With decreasing numbers of polygons, increasingly less details can be realized. To make the own vehicle's image look right or correct while having a low or restricted number of polygons (for example, less than about 10,000, more preferably less than about 8,000 or the like), the present invention may use "bump mapping" methods when applying the own vehicle's surface maps onto the vehicle's polygon surfaces (such as by utilizing aspects of the systems described in U.S. provisional applications, Ser. No. 61/602,878, filed Feb. 24, 2012, and Ser. No. 61/678,375, filed Aug. 1, 2012, which are hereby incorporated herein by reference in their entireties, which suggests to use 'Parallax Occlusion mapping' for automotive visions systems in general and especially on the surface of imposters). By that, missing contour details can be faked into the image pleasing to the viewer (usable for human vision not for machine vision). Peculiarities of bump mapping is "Normal mapping" also called "Dot3 bump mapping" (enhancement of the appearance of details by faking the lighting (scattering and shading) of bumps and dents generated by a normal map of a high polygon model). "Parallax mapping" or "virtual Displacement mapping" is a peculiarity of Normal mapping. Hereby the displacement of a point of a rendered polygon may be mapped according the viewing angle. This gives (rough) surfaces the illusion of an apparent depth. Basic Parallax mapping does not account for occlusion. "Occlusion mapping" is a peculiarity of Parallax mapping. By using a displacement map, self-occlusion and fake reflections relative to the perspective may be possible to be mapped onto a polygons mapping surface. For the viewer it is nearly indiscriminate whether he sees a flat surface with Occlusion mapping or a real complex three dimensional (3D) surface on a two dimensional (2D) display screen.

Figure 17:
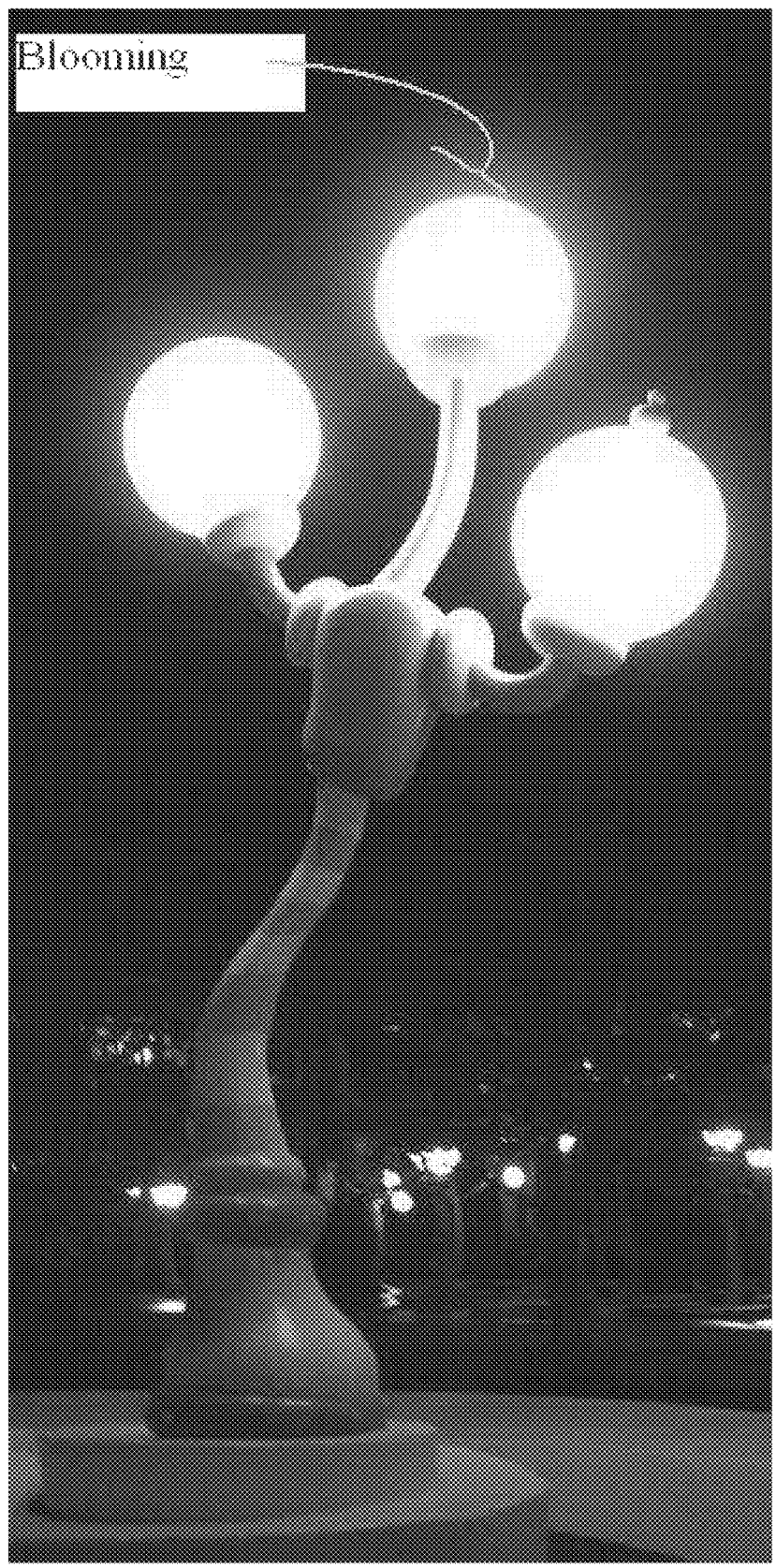
FIG. 17 shows an example of a natural image taken by a conventional hand held camera having a blooming effect around the bright light sources caused by the camera system.
Figure 18:
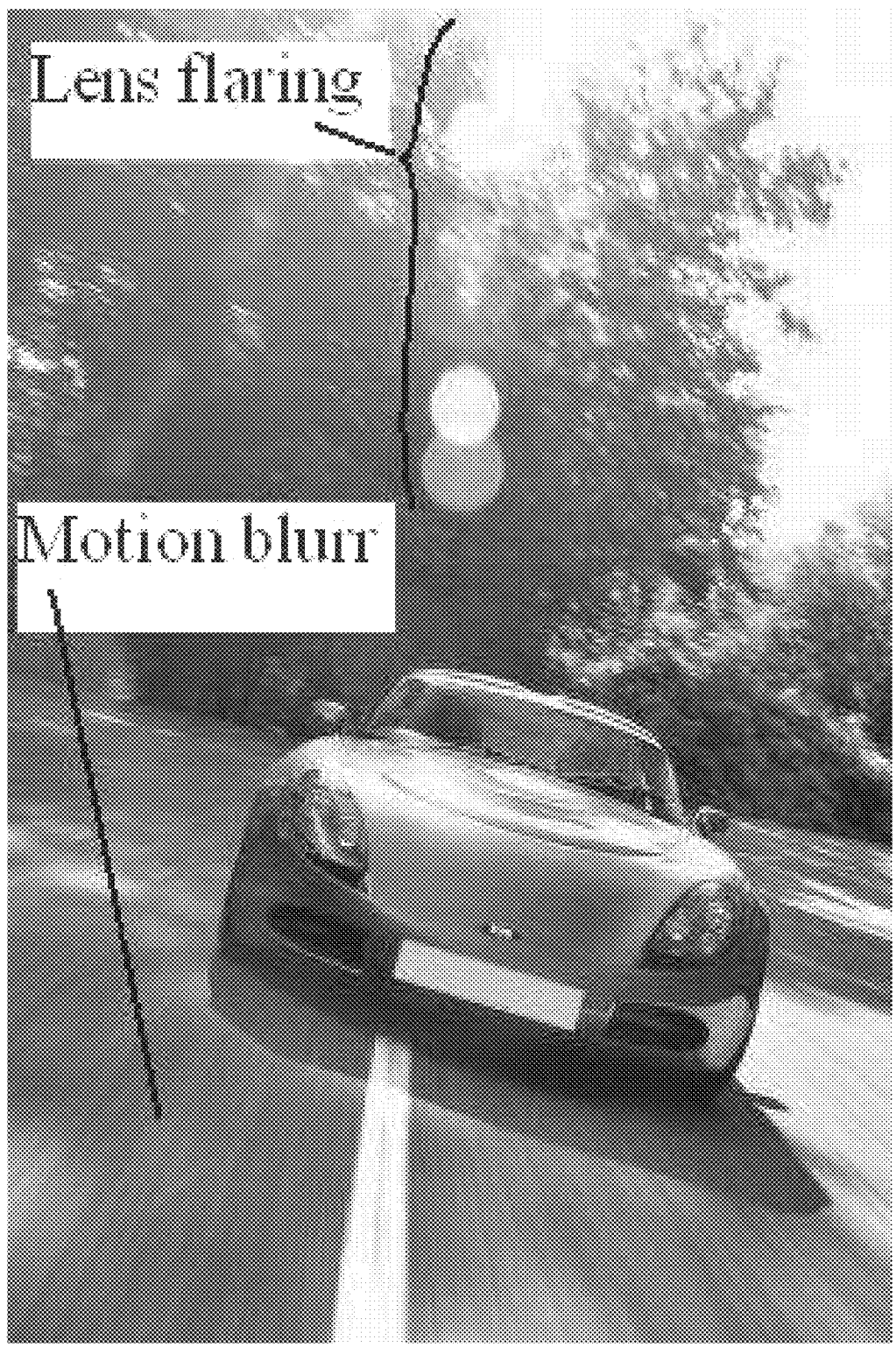
FIG. 18 shows an example of a natural image of a vehicle which is in motion, with the camera's view point in motion as well, such that the surrounding blurs due to motion blurring, and showing lens flaring caused by a bright light source in combination to the camera objective's lens system.

Since the display screen may not have the contrast level and the light intensity of possible light sources in nature, bright light reproduced on display screens typically looks quite flat. To enhance the illusion for looking at bright light in vehicle vision systems, the system of the present invention may use "Bloom shading". By a fake aperture diffraction bright light appears to exceed beyond its natural area. Natural cameras do this by nature, depending on their optical and imagers properties due to aperture diffraction and pixel cross talking (see FIG. 17). This artificial effect may preferably come into use when an artificial light source becomes added to a vision system's scene. An additional artificial effect which is herein suggested to use as well is "adding of fake lens flares", whereby the lens flaring (which can be observed on real cameras images when pointing to the near of bright light spots caused by the lens systems scattering and refraction (see FIG. 18)) becomes imitated. In nature as well as in the fake effect, the distance and intensity of the flares may change by the viewing angle to the light source (which may be added artificial or is a real scene light source). Artificial flares may consist of colored round shapes having increasingly higher transparency in the center than at the outer portions or outlines. There may be star shape glares coming from the center of such artificial flares.

Figure 19A:
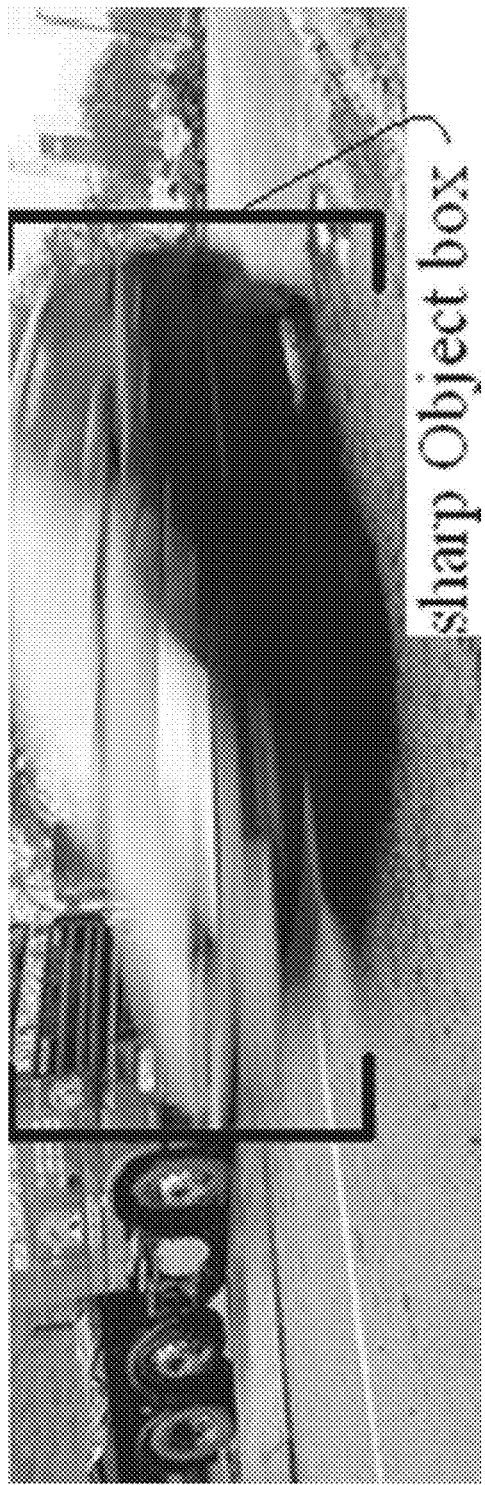
FIGS. 19A and 19B show an example of a natural image of a vehicle which is in motion while the camera is static, with FIG. 19A showing a not blurred object box around the moving vehicle, and FIG. 19B showing the same scene as in FIG. 19A, having an object box around the vehicle which is artificially motion blurred in the same extend then the moving vehicle.
Figure 19B:
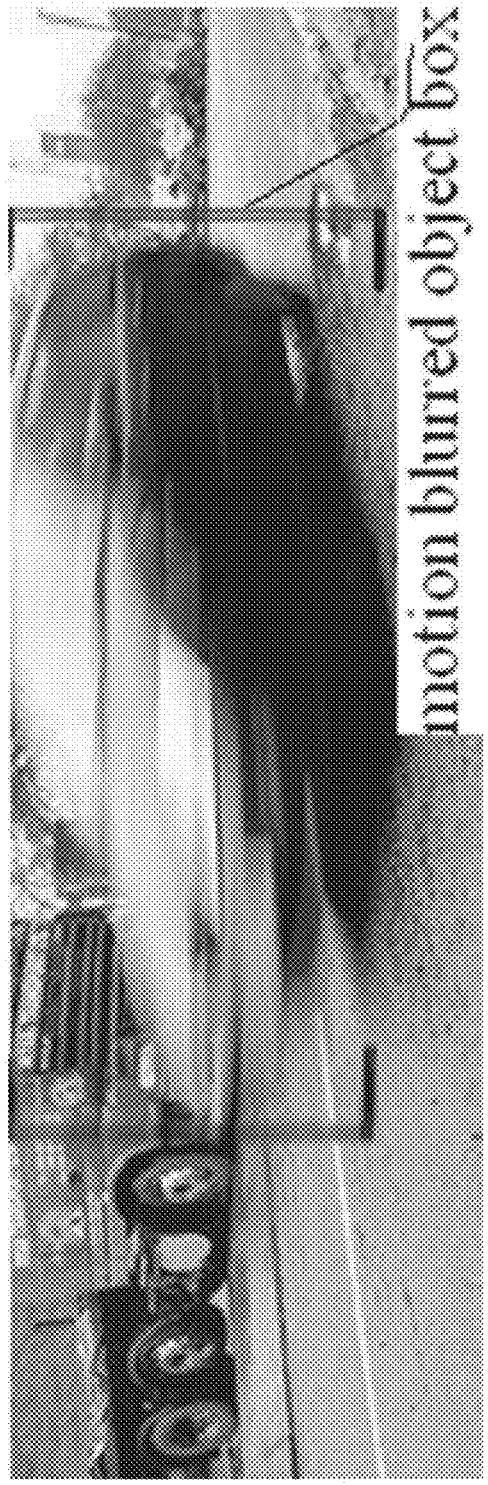

An additional artificial effect which is suggested herein to use in the vehicle vision system is "artificial Motion blurring". This effect can be observed on real camera's movies when fast objects pass a scene (see FIGS. 19A and 19B) or a camera's viewing angle is changing fast relative to the scene or the scene flow is fast (see FIG. 18). In vehicle vision systems, for example, box-like overlays which may be placed by an object tracking system around tracked objects may become (motion-) blurred artificially into the opposite direction an object is moving towards. Comparing FIGS. 19A and 19B, FIG. 19A shows a not blurred object box around a moving object which is motion blurred by nature, while FIG. 19B shows a moving object having an object box around it which is artificially motion blurred in the same extend as the moving object. By that the object box appears less artificial but more as a part of the real scene. When an object is moving but is static within the camera's view it leads to blurring of the surrounding scene, but the object is not blurred (see FIG. 18).

The top view image may come with a certain noise level depending on the hardware's quality and/or algorithm's quality. The displayed vehicle on top is a rendered overlay with a low noise level. Due to the different noise levels the overlay appears quite artificially. This is typically done to ease the viewing. The stitching of abutting images within a top view display is often not optimally resolved. If done well, the user cannot readily discern where the stitching/overlapping area begins and ends. The transient from one image to the other becomes mostly invisible or not readily discernible.

The present invention provides a solution to make objects and areas around the vehicle captured by the cameras and/or further sensing systems visible within the display, although the displayed vehicle image may be in the line of sight from the virtual view point to the objects/areas.

The present invention may provide such a solution by displaying the displayed subject vehicle image as a fully or partially transparent vehicle image or vehicle representation. The transparency may be a dependency of the distance, and/or the angle aberration from the center viewing direction of the virtual camera or viewpoint (such as can be seen with reference to FIGS. 2-5). For example, the value or degree of transparency (T) may equate in dependency to the distance (d) and aberration angle ($\alpha$) from the center viewing direction in accordance with the equation:

$$T(d,\alpha) = T * \tfrac{1}{2} * ((1 - 1/d * k_1) + (1 - \alpha * k_2));$$

where $k_1$ is a scaling factor (parameter) for the distance in [1/mm], and $k_2$ is a scaling factor (parameter) for the aberration angle.

Optionally, the transparency may be a dependency of whether the virtual camera is within the (own) vehicle's body or outside of the subject or equipped vehicle. Optionally, the transparency may be a combination of dependency of the equation above and the location of the virtual camera. Optionally, the transparency may be dependent or at least may be influenced by the level of backlight and/or a combination of one or more of the other factors above. Optionally, the transparency may be dependent on a location of a detected object at or near the vehicle whereby the displayed images may not show the detected object when a portion of the three dimensional vehicle representation may block or obscure the object when the vehicle would be at least partially between the object and the virtual camera, as discussed below.

Optionally, the vision system may display the subject vehicle image as a vector model shape without solid surfaces. The vector model shape may be shown or displayed dependent on whether the virtual camera is within the (own) vehicle's body or outside of the subject or equipped vehicle. The options for the criteria that determine the degree of transparency of the displayed image may be selectable by the driver within a vehicle's OBD (on-board diagnostics), or via remote device or vehicle manufacturer service tool or vehicle repair or service shop (manufacturer or aftermarket) service tool.

The vision system of the present invention is also or otherwise operable to match the appearance of the vision system's shown or displayed (own) vehicle to that of the appearance of the real or actual subject or equipped vehicle as close as possible, or to customize the displayed vehicle's appearance.

The display or customization may be adjusted individually by the vision system actively making the adjustment/customization. For example, the vision system's processor or cameras or other sensors may identify the color of the equipped vehicle (such as by processing of captured images of portions of the equipped vehicle as captured by its cameras or other sensors), and further on may match or substantially match or coordinate the visualized or displayed vehicle's color accordingly. Optionally, the vision system's cameras or other sensors and algorithm may identify the "real" vehicle's surface appearance by the images taken from the vehicle direct and further on may "map" the identified surface to the image of the vehicle displayed or shown on the display screen by the vision system. Optionally, the vision systems cameras or other sensors and algorithm may analyze, stitch, dewarp, and the like the captured images to identify the "real" vehicle's surface appearance by the vehicle's appearance seen in reflecting surfaces distant to the vehicle, and further may "map" the identified surface to the image of the vehicle displayed or shown on the display screen by the vision system.

Optionally, the display or customization may be adjusted individually and may be a passive adjustment/customization in accordance with given parameters. For example, the parameters may be first time transmitted or updated at the line or end of line of the vision system manufacturer or of the vehicle manufacturer. Optionally, the parameters may be first time transmitted or updated by a supporting system embodied to the vehicle, such as via any kind of data channel, such as via a one-time initial system power up or all time on power up of the system. Optionally, the parameters may be first time transmitted or updated by a supporting system not permanently installed to the vehicle, such as a remote/mobile device or system or device or tool at a vehicle shop (such as at a manufacturer facility or aftermarket device or facility) or such as a driver input via the vehicle's OBD.

Optionally, the display or customization of the vehicle representation or vehicle image may be adjusted individually or freely by mapping one or more images of the vehicle (such as the subject or equipped vehicle) that is to be shown in the display of the vision system. Such images or vehicle representations may be uploaded by the system manufacturer or the vehicle manufacturer, or by the customer or active software (that may be developed for this operation/function). For example, the mapped images may be digital photographs of the actual equipped vehicle, or may be previously captured images or generated images selected to correspond to the actual vehicle car line and/or body style and/or trim options and/or color. The mapped images may comprise one or more images captured or generated to represent the equipped vehicle from one or more viewpoints that may correspond with the virtual camera viewpoint in the displayed images. For example, at the vehicle assembly plant, when the vision system is installed in the vehicle (or earlier at the vision system manufacturing facility if the vision system is made for a particular car line or the like), the system may be set to correspond to the actual vehicle in which it is installed. Thus, an operator at the vehicle assembly plant may enter "Buick Enclave Silver" or other manufacturer name/code, vehicle line/code and color/code and/or the like (or the vision system may be automatically set according to the manifest or bar code for the vehicle in which the system is being installed), and images or representations of a silver Buick Enclave may be downloaded into the vision system or control for use as the displayed vehicle images when the vision system operates to display images for viewing by the driver of the equipped silver Buick Enclave.

Optionally, the mapping interior of the vehicle may be set by parameters or may be uploaded by the vision system manufacturer, the OEM, the vehicle buyer (owner) or contracted as a third party service. For this mapping, advance (bump-) mapping methods for faking structure of the types mentioned above (Normal mapping, Occlusion mapping or Parallax mapping) may come into use as well. The vehicle interior's structure may be rendered by a low number of polygons with a bump map mapped onto it, instead of having a high number of polygons. A low level variant may be to just map the interior onto the window surfaces. This may substantially reduce the numbers of required polygons for the inner structure. It is known to map the driver's face into the interiors scene. It is unknown in automotive vision systems to integrate the driver's face into a bump map. The driver's face bump map may become produced offline out of two or more images from different viewing angles. The driver's mapping may be placed on top of a neutral body made by a low number of polygons.

Optionally, the interior's scene may be not static but calculated in real time to render the interiors polygons and its mapping. The input of the interior's scene including the instrumentation may be composed (stitched) out of the images from one or more interior cameras (and may be out door cameras looking inside in parts) which may be in front of the passengers. The area which does not become captured by any camera may be a static non real time image which may become partially blended (merged) into the real time image to fill missing parts.

Optionally, the displayed images may comprise a combination of the adjustment and/or customization of the displayed equipped vehicle image or representation and the partial or full transparency of the displayed equipped vehicle image or representation to further enhance the display of the equipped vehicle and environment surrounding the equipped vehicle for viewing by the driver of the equipped vehicle, such as during a reversing maneuver or parking maneuver or the like.

To cope with the overlays which are placed over vision systems images, especially the own or subject vehicle's top view overlay or representation, which appear artificial due to mismatching noise levels, it is heretofore unknown in automotive vision to raise the noise level of the overlays artificially. Overlays which are there for highlighting important facts to the driver, such as control buttons or inputs or the distance to a solid obstacle at the projected rearward path of travel of the vehicle when the vehicle is backing up, may appear as clearly as possible to become highlighted so such an overlay should not become acknowledged or discerned as a part of the scenery. Thus, such overlays may be superimposed in a low noise level.

However, for different overlays which are for providing an understanding of the general scenery the driver is looking at, there is not a concern that they be seen as clearly. Thus, it may help the driver's viewing and understanding of the displayed images to superimpose the top view of the vehicle when providing four stitched camera images as a top view, and, to ease the viewing, the vehicle may appear as embedded to the scenery. Thus, the noise level should become adapted to the noise level of the images. Naturally, the noise level of the camera images are higher than that of the overlay or overlays, so to adapt or match the noise levels, the noise level of the overlay or overlays has to be increased (or otherwise adapted or adjusted). In some systems, the images of the four (or more) cameras may come with different noise levels for some or each of the cameras, and thus the overlay may be adapted to an average noise level or to a noise level at about the lowest or the highest noise level value of the captured images. The noise level may be set by parameters, since the cameras and system's features do not change much over life time, or the noise level may be determined by a suited algorithm during a run time of the system or during an initial phase of the system.

When the noise level is selected, the noise to the overlay may be added by (i) use of a scrim diffuser, soft focus or blur effect filter/generator, (ii) use of a salt and pepper noise filter/generator, (iii) use of image analogies filters which may transfer image analogies from one or more camera images and project the analogy to the overlay or overlays, (iv) generation of overlays with semi-transparent borderlines, having increasing transparency with diminishing distance to the borderline over the full overlay or partially, (v) use of one or more (offline or initially calculated) stored overlay or overlays which have already diffuse borderlines (and optionally with a look up table for different levels of noise to become achieved), or (vi) by reducing the acutance, if present.

To optimize the appearance of the stitching/overlapping area of abutting images within a top view display, the method "Texture Splatting" or "Texture Blending" may be used. Hereby also called alphamap comes into use for controlling the transparency ratio of the overlapping areas. Such alphamapping is known and, because the underlying principle is for each texture to have its own alpha channel, large amounts of memory may be consumed by such a process. As a solution to this potential concern, multiple alpha maps may be combined into one texture, such as by using a red channel for one map, a blue channel for another map, and so on. This effectively uses a single texture to supply alpha maps for four (or more or less) real-color textures. The alpha textures can also use a lower resolution than the color textures, and often the color textures can be tiled. This might also find use for top view image blending.

Figure 7:
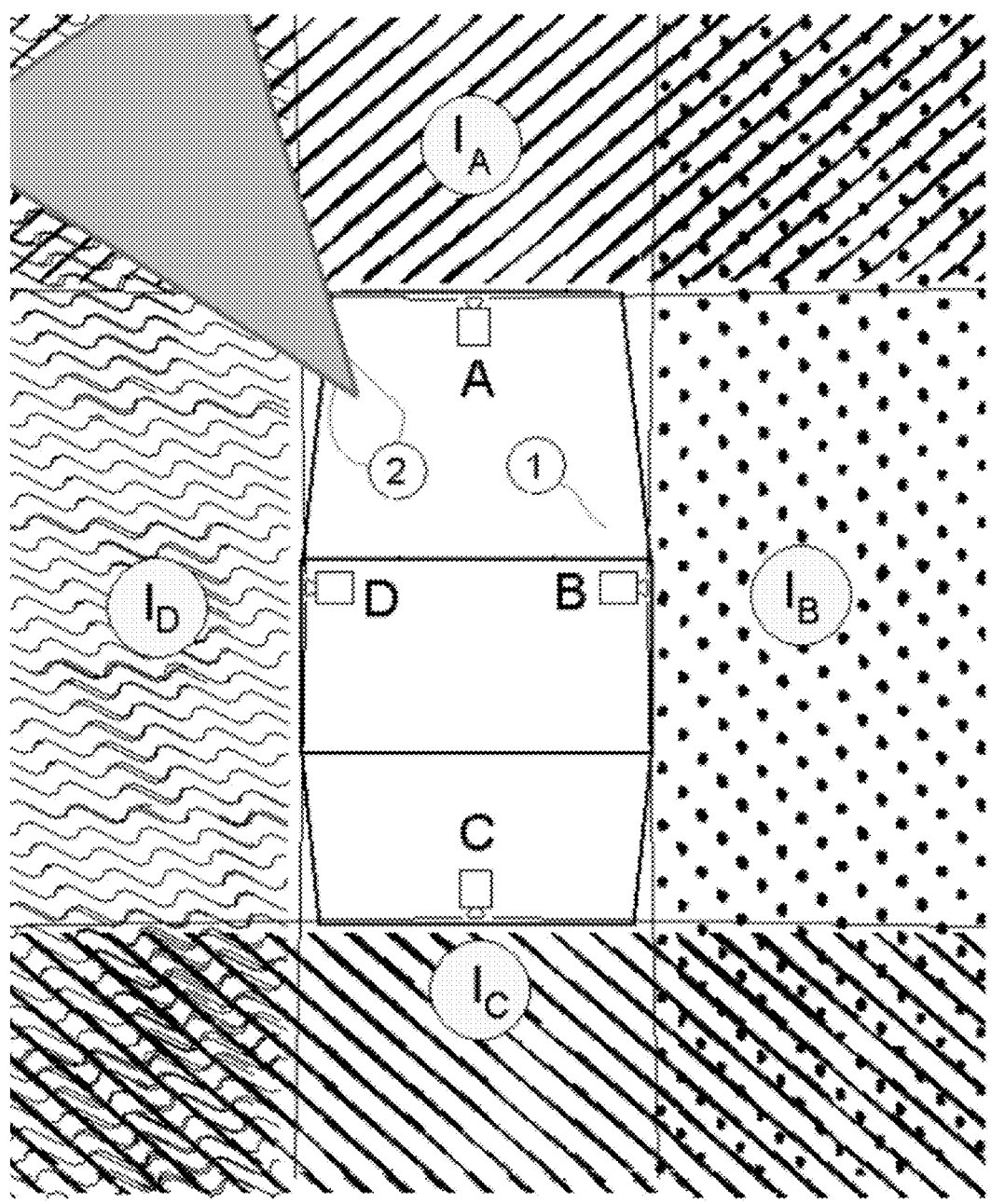
FIG. 7 is a plan view of an automotive vision virtual top view system with four cameras A, B, C and D, which capture respective images $I_A$ to $I_D$ which have overlapping regions in each corner, with the cameras having a fish eye lens system with an opening angle of about 180 degrees, such that, for generating a virtual top view, the $I_A$ to $I_D$ images are already distorted, dewarped, cropped and aligned accordingly, and shown with the upper left corner selected and highlighted as gray triangle.
Figure 12:
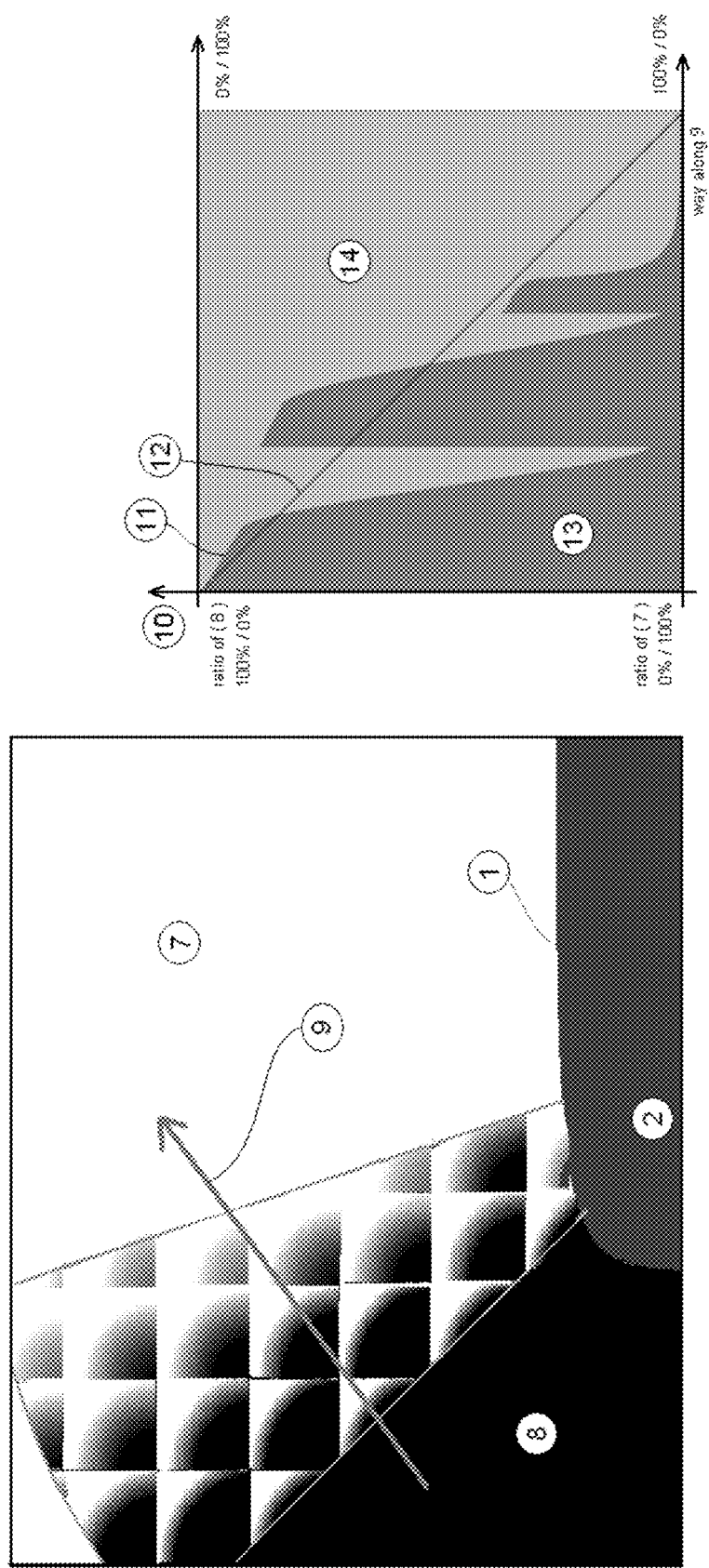
FIG. 12 is an illustration of an exemplary path with an alpha gradient value shown in diagram (10), wherein higher levels mean a higher ratio of camera D to camera A, and lower levels mean a higher ratio of camera A to camera D in the camera's image texture blending, with zone (7) being representative of 100 percent camera A and zone (8) being representative of 100 percent of camera D.
Figure 13:
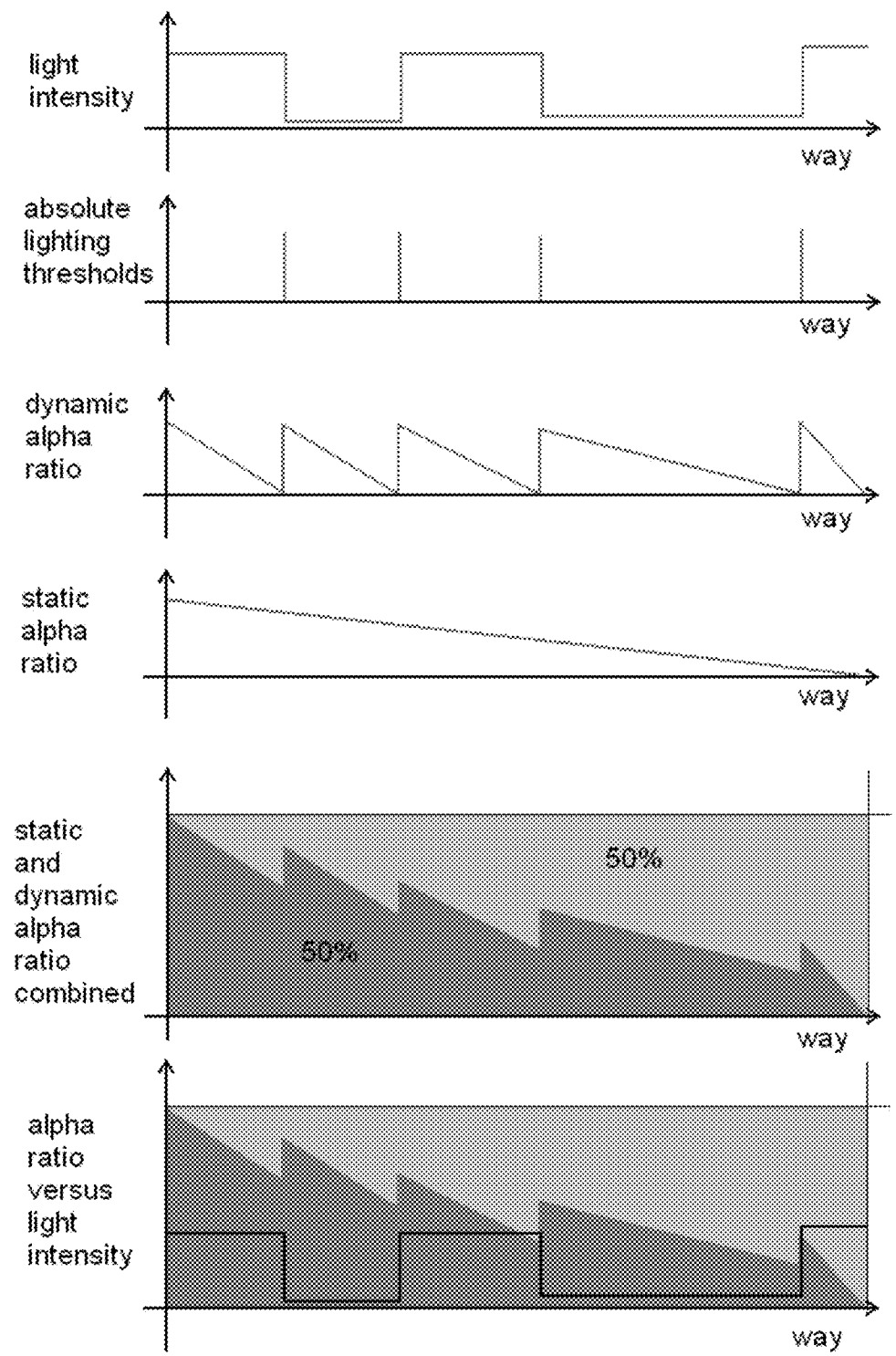
FIG. 13 illustrates an example of how light intensity gradients thresholds are used as input to generate the dynamic alpha gradient curve (in one dimension), which is combined with the static sliding transition alpha map, with the gradients transition set up as linear, and wherein the graph at the bottom of FIG. 13 showing how the skips of the alpha map are dedicated to skips in the light intensity (and with the color thresholds ignored in these diagrams)
Figure 14:
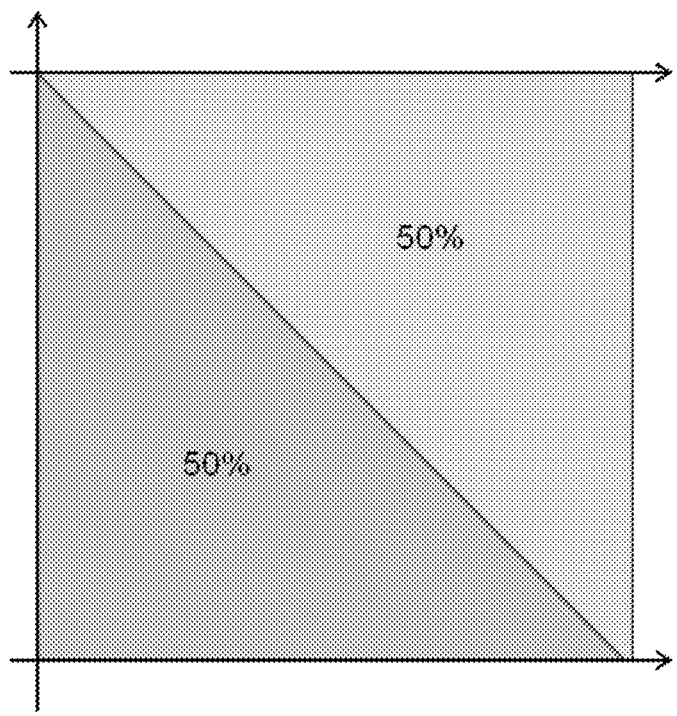
FIG. 14 is a resulting alpha map without detected thresholds using linear transition.
Figure 15:
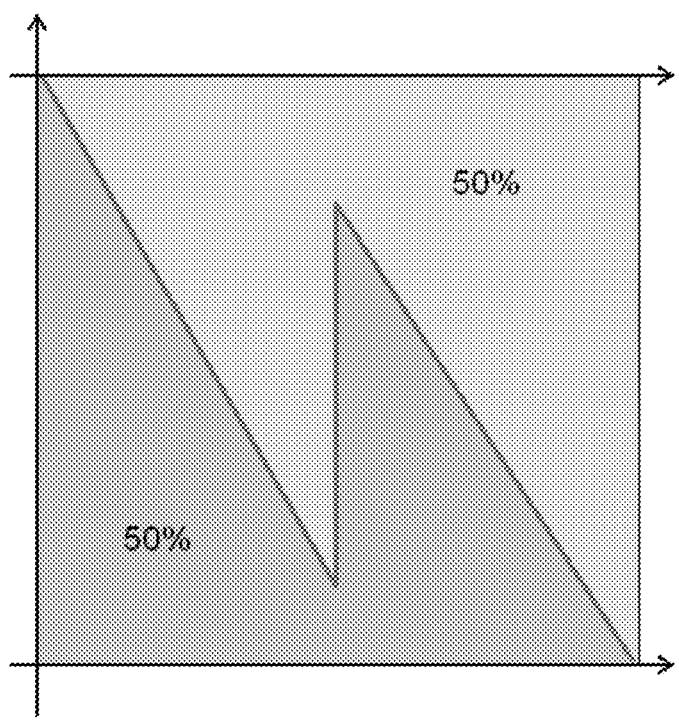
FIG. 15 is a resulting alpha map having one detected threshold using linear transition.
Figure 16:
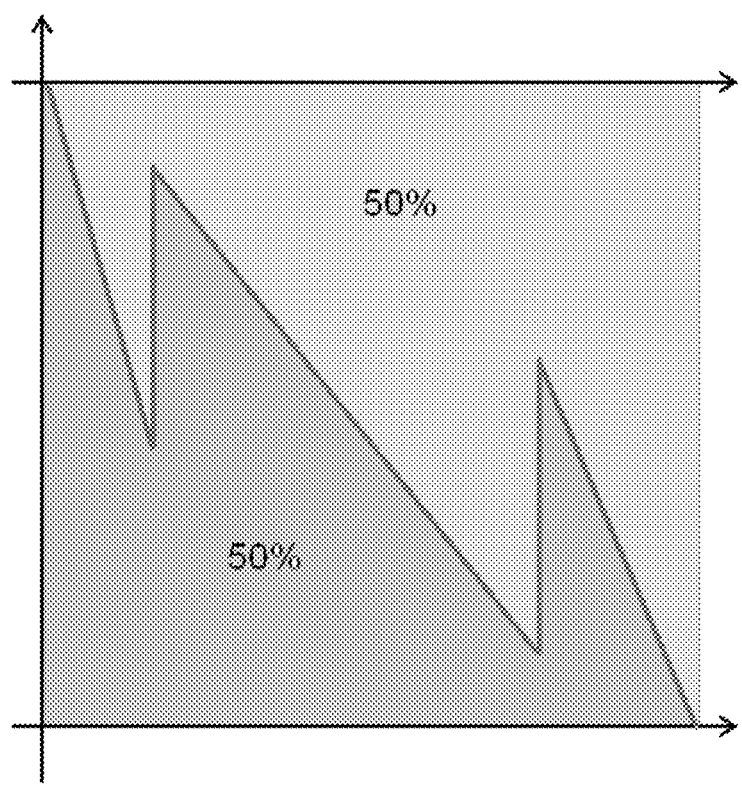
FIG. 16 is a resulting alpha map having two detected thresholds using linear transition.

It may be suggested that the alpha map (generally) possess a sliding gradient from 100 percent to zero (0) percent for one camera's captured image and zero percent to 100 percent for the other camera's captured image (see FIG. 12). With a four camera system, the blending zones are typically at the four edges of the virtual top view (an upper left corner region, an upper right corner region, a lower left corner region and a lower right corner region, such as shown in FIG. 7) and the alpha map gradients vector may be mostly orthogonal to the vehicle's edge, eventually slightly bent to the vehicle's center.

Figure 8:
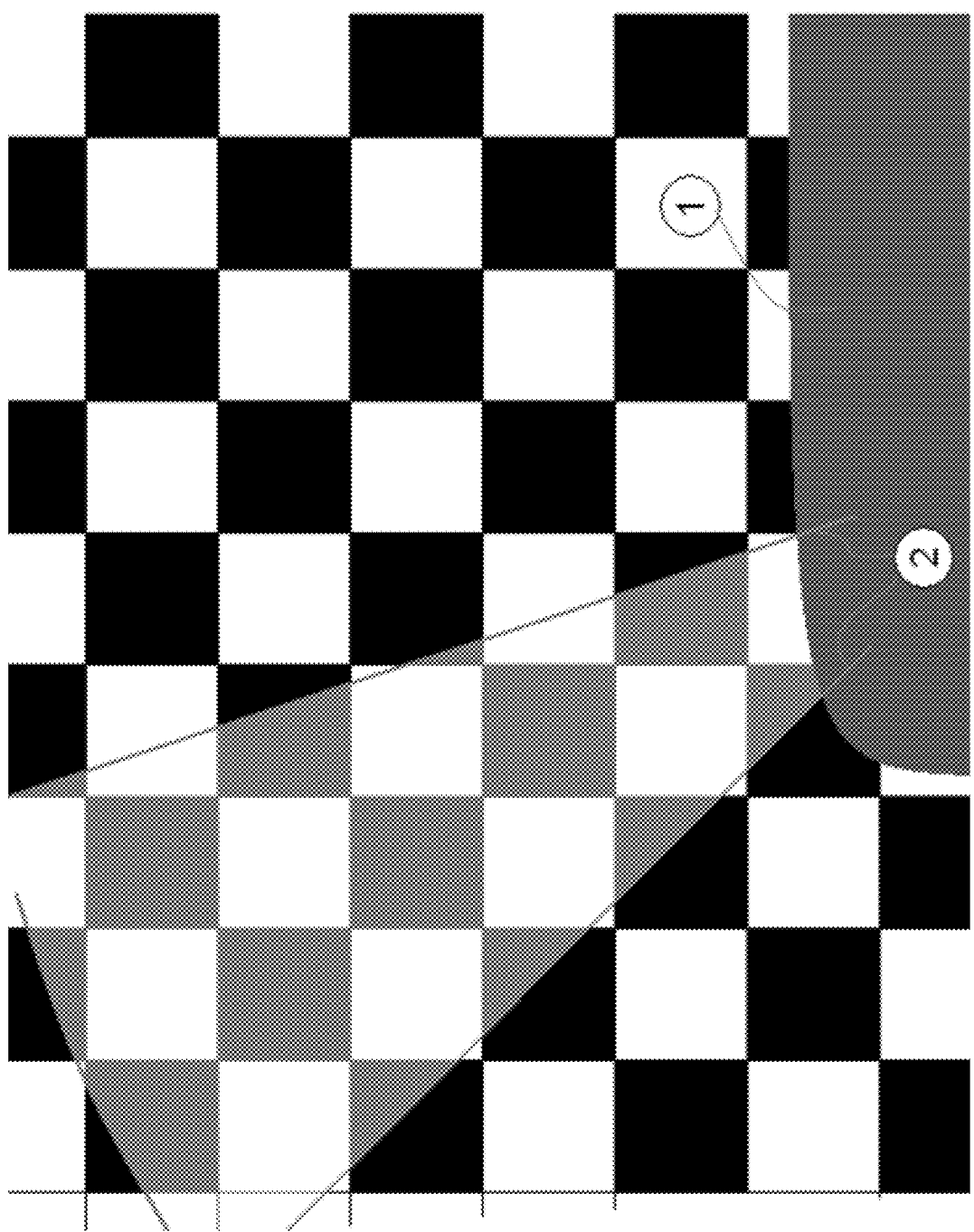
FIG. 8 is an enlarged view of the upper left corner of the virtual top view of FIG. 7, shown, for illustration, with the vehicle disposed at the ground with a checkerboard pattern, and with an area of interest highlighted in light gray.
Figure 9:
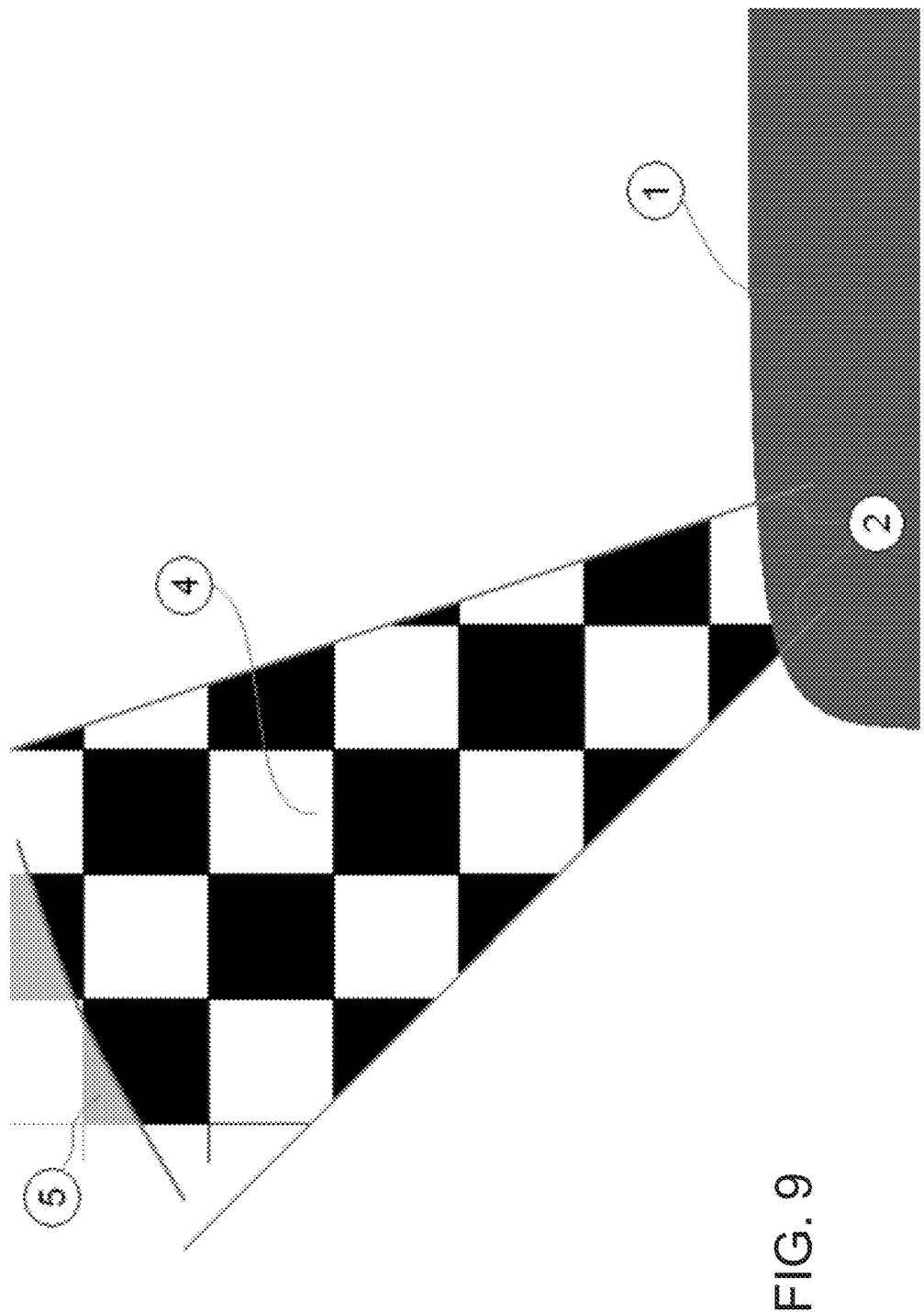
FIG. 9 is a view similar to FIG. 8, with the highlighted region being a further processed (blending) area of interest (4), and wherein the area (5) at the far distant end may be neglected or ignored or may have reduced processing since the image resolution has diminished too much for showing details at that area.
Figure 10A:
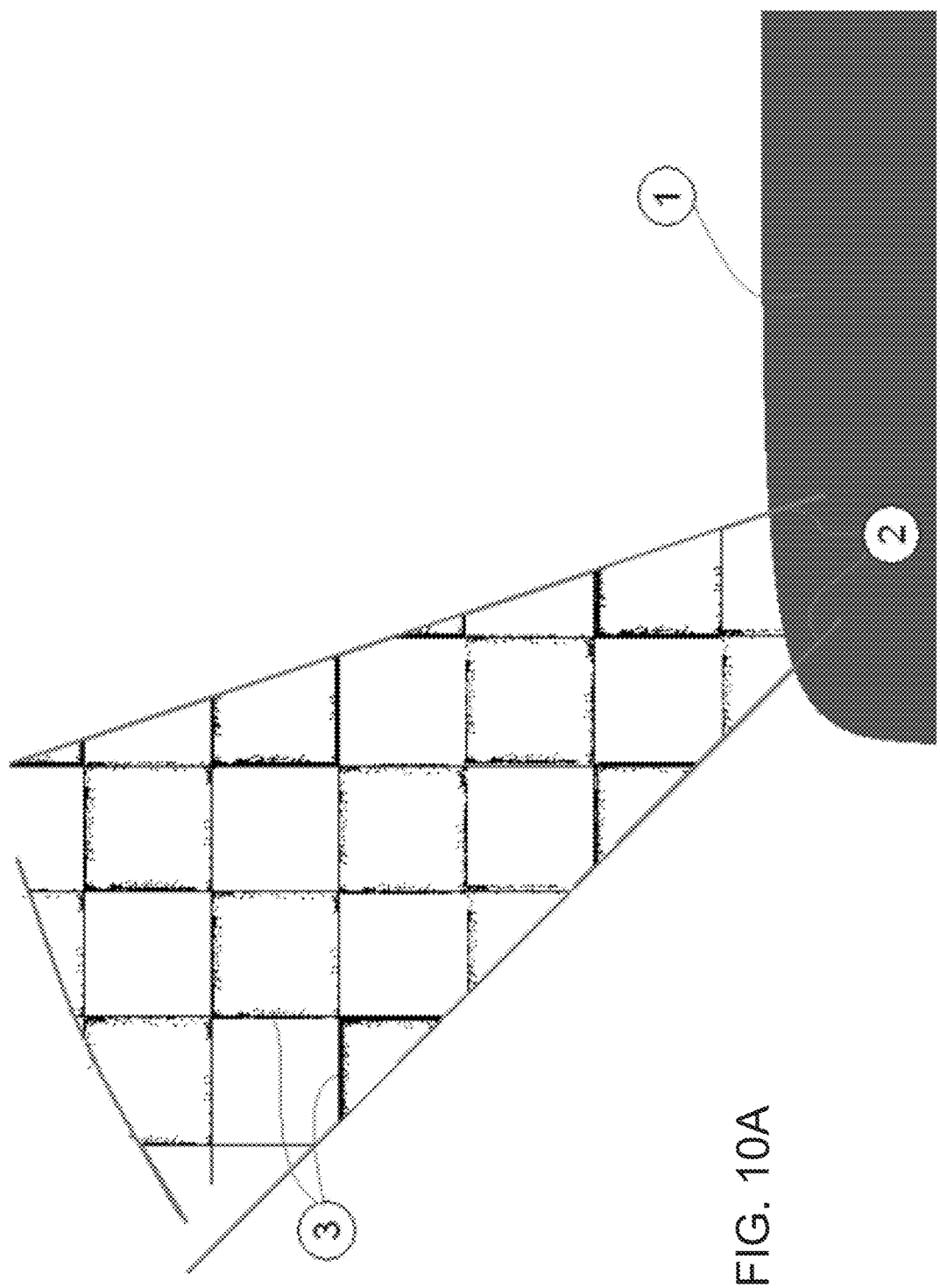
FIG. 10A is another view of the scene of FIG. 9, showing the excavated illumination and color borderlines, generated by altering the brightness transfer function which produces in contrast enhancement that serve as input patterns for the dynamic alpha mask of the present invention.
Figure 10B:
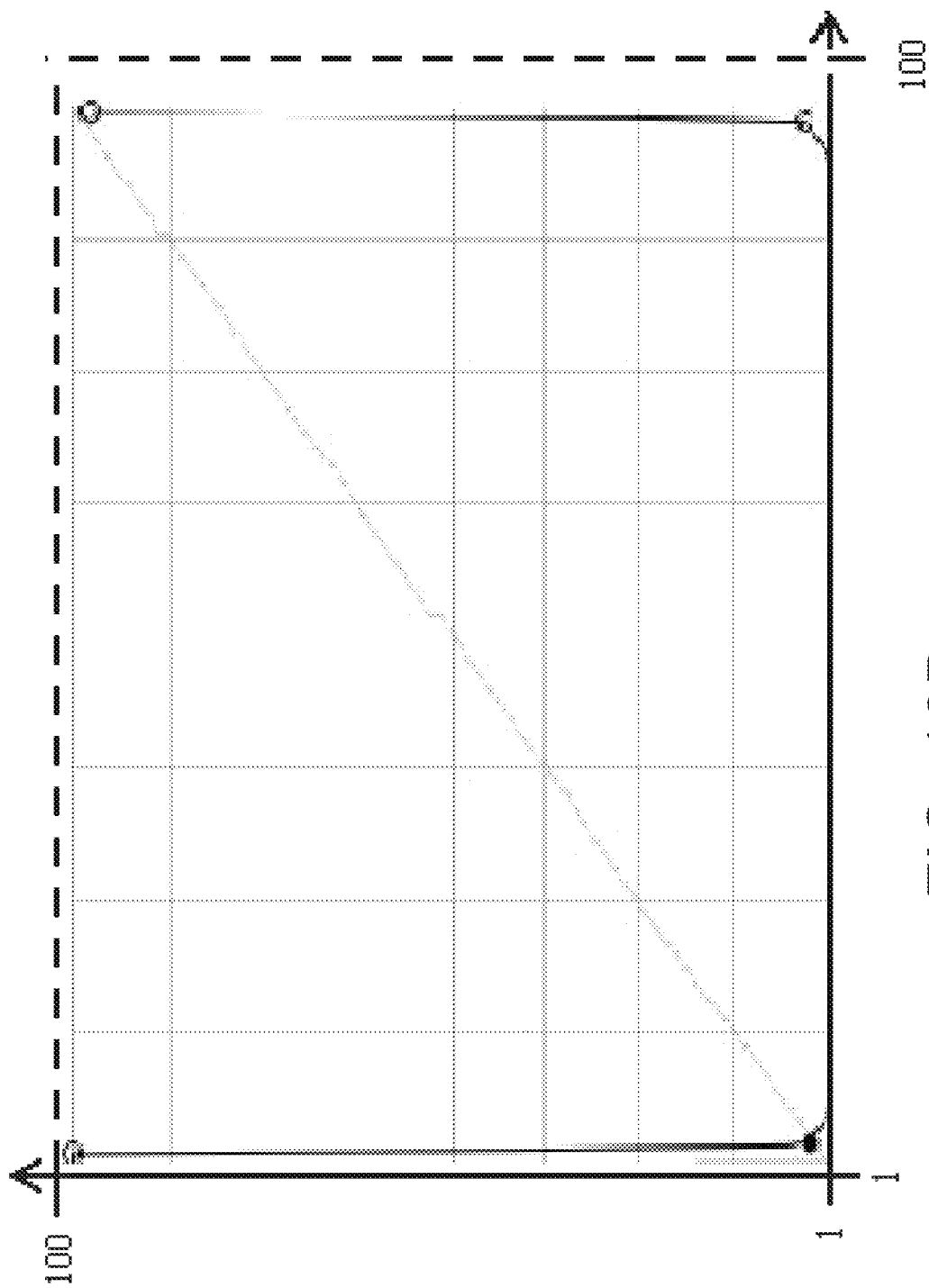
FIG. 10B shows a brightness transfer function suitable for generating contrast enhancement as on area (4) of the image in FIG. 9 which results in FIG. 10A.

It may be suggested that the blending zone has a V-shape with the open side pointing into the top view's corner. The borderlines may be comprised by the V blades (see FIG. 8).

With reference to FIGS. 7-12, reference (1) refers to a vehicle or vehicle body, reference (2) is the blending region's borderlines equates to alpha map expansion, reference (3) is a strong Illumination and color threshold, reference (4) is a blending region with structures of interest, reference (5) is a neglected or ignored region, reference (6) is an area of local alpha map gradient ("local transition"), reference (7) is a region of 100 percent intensity of camera A, reference (8) is a region of 100 percent intensity of camera D, reference (9) is an alpha map gradient example path, reference (10) is a diagram of an alpha map gradient intensity along an example path, reference (11) is an alpha map gradient intensity curve along an example path, reference (12) is a static base gradient curve over the blending area, reference (13) is an alpha_intensity of camera D, and reference (14) is a (1-) alpha_intensity of camera A.

It may be also or otherwise be suggested that the alphamap is not static, but influenced by the image's structure. The blending area may be formed such as discussed above and there may still be a static sliding gradient such as discussed above from one borderline to the other, but this gradient may be combined with a dynamic part. The dynamic component may orient on strong illuminance and/or color thresholds (this may be done in a manner similar to that described in Zitnick, Lawrence, *IEEE Transactions on Pattern Analysis and Machine Intelligence*, Vol. 34, No. 4, April 2012, which is hereby incorporated by reference herein in its entirety, but not for finding the correct image overlap alignment, but rather for finding the input of an alpha map filter). At these thresholds, the alpha map gradient may be increased during the gradient over the areas without thresholds or may be decreased.

The system of the present invention may also use a "flood fill" algorithm to deploy (find) smooth alpha maps through areas which are borderlined by structures within the image which are ending within the overlapping area of two cameras. A typical path found by flood fill would look as like path 20 shown in FIG. 11B. In here the general "fill" direction is from camera A, reference (8) to camera B, reference (9). Structures in the image depict hereby invisible boundaries along the fill that are filling up until overtopping on the structure's end. The older fill increments reflect darker mapping regions (more blending percentage of camera A), and younger ones lighter regions (more blending percentage of camera B). Illustratively speaking, the result looks like as filling in a jam like paint at one far edge of the alpha map of camera A, reference (8). The thickness of the paint after some time represents the percentage of the lending of camera A to B.

The source image for determining the illuminance and/or color threshold may be the image of just one camera or may be generated by a 50%/50% superposition of two or both cameras, with a consecutive (Gausian) blurring, artificial diffusion or resolution reduction for uniting areas which are originating in the same structure but are not fully matching due to imperfect distortion correction or reconstruction (de-fisheye and view point elevation), color and white balancing and resolution differences.

Figure 11A:
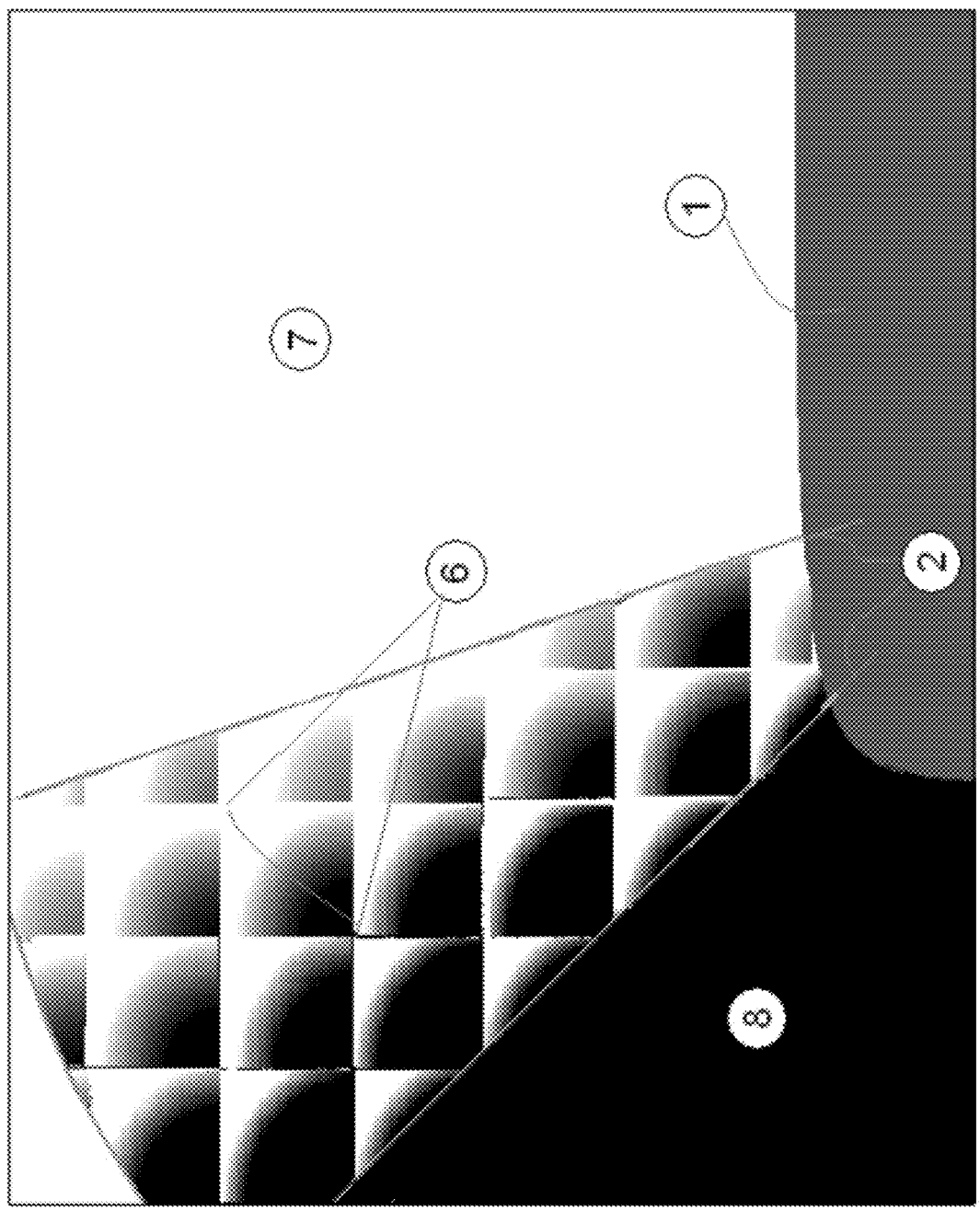
FIG. 11A is another view of the scene of FIG. 10A, showing the resulting alpha mask which was composed by a static sliding gradient orthogonal to the vehicle's edge and a dynamic component which is oriented on structures within the images.
Figure 11B:
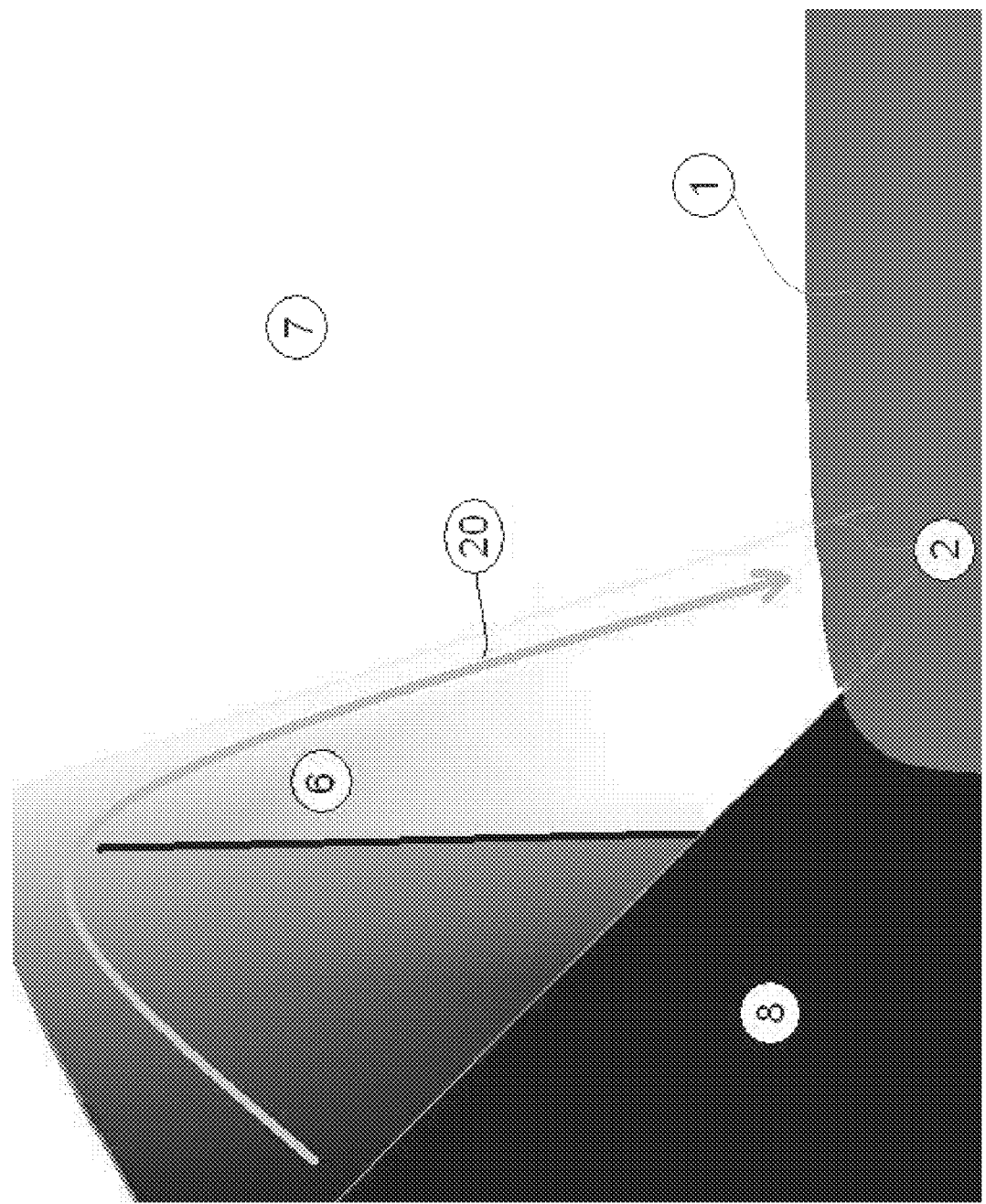
FIG. 11B is another view of a different alpha map mask which was composed by running a static sliding alpha gradient borderlined by structures within the image, with this example having just one structure which ends within the stitching area, and with the alpha gradient following a path (20) found by a flood fill algorithm.

Optionally, the gradients transition of the whole area and/or the local transitions may be set up as generally linear such as illustrated in FIGS. 13-16, or logarithmic such as illustrated in FIGS. 11 and 12, or in any other suitable mathematically consistent manner.

Optionally, for data reduction and/or calculation effort reduction, a quantification (inconsistent manner) may find use for a certain extend in which these measures do not significantly worsen the subjective or objective appearance.

Optionally, and in addition to the above or as alternative solution, the alpha map may be generated by the use of half toning/dither pattern or error diffusion pattern algorithm or the like. Such patterns may have sliding parameters along their extension. Optionally, an embodiment may be that the areas with the most distortion reconstruction, typically the farthest edges of fisheye lens images, become influenced (filtered) the most. This is different from just weighing bending such as is known and such as described in EP publication No. EP000002081149A1, which is hereby incorporated herein by reference in its entirety.

Therefore, the present invention provides a vision system for a vehicle that includes a processor or head unit and a camera or cameras mounted at the vehicle. The processor or head unit is operable to merge captured images to provide a surround view or virtual view of the area at least partially at or surrounding the equipped vehicle, and may select or adjust or customize a generated vehicle representation and/or the displayed image so that the displayed image of a vehicle representation that is representative of the equipped vehicle is actually similar (such as in body type or style and/or car line and/or color) to the actual vehicle equipped with the vision system and display screen. Optionally, the displayed vehicle representation may be adjusted to be more or less transparent to enhance viewing of objects detected at or near the vehicle (such that, for example, the displayed vehicle representation may be more transparent or substantially transparent when an object is detected that may be blocked or partially blocked or hidden by the displayed vehicle representation, such as when the virtual camera angle and/or distance is such that the detected object is at least partially "behind" the displayed vehicle representation and/or when a detected object is very close to the equipped vehicle or partially at or possibly partially under the equipped vehicle), so as to enhance viewability of the images of the detected object by the driver of the vehicle. The noise level of the overlays may be adapted or increased to generally match the noise level in the captured images to provide enhanced display qualities and seamless display images.

Optionally, a vehicle vision system and/or driver assist system and/or object detection system and/or alert system of the present invention may operate to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from one or more cameras and may provide a displayed image that is representative of the subject vehicle (such as for a top down or bird's-eye or surround view, such as discussed below), with the displayed image being customized to at least partially correspond to the actual subject vehicle, such that the displayed vehicle is at least one of the same or similar type of vehicle as the subject vehicle and the same or similar color as the subject vehicle.

Optionally, the method or system or process of the present invention is operable to process image data and calibrate the cameras so the images are accurately or optimally merged together to provide the top down or surround view display, as discussed below.

Vehicle vision systems may include more than one camera or image capture device. Often, there are cameras at the front, rear and both sides of the vehicle, mostly integrated into the vehicle's structure, and mounted in a fixed position. Vision systems are made for displaying the vehicle's environment, highlighting hazards, displaying helpful information and/or enhancing the visibility to the driver of the vehicle.

It is known to merge or stitch images captured by and coming from more than one camera or image capturing device, in order to provide a 360 degree surround view. The cameras typically use a wide focal width, commonly referred to as a fish eye lens or optic, for providing a wide angle field of view, typically about 180 degrees to about 220 degrees for each camera (such as for a four camera vision system). Typically there are overlapping regions in the fields of view of the cameras. By providing such a wide angle field of view, the field of view of the cameras typically not only include the environment around the vehicle, but partially includes the vehicle's body as well, such as at the lateral regions of the captured images of each camera.

Figure 20:
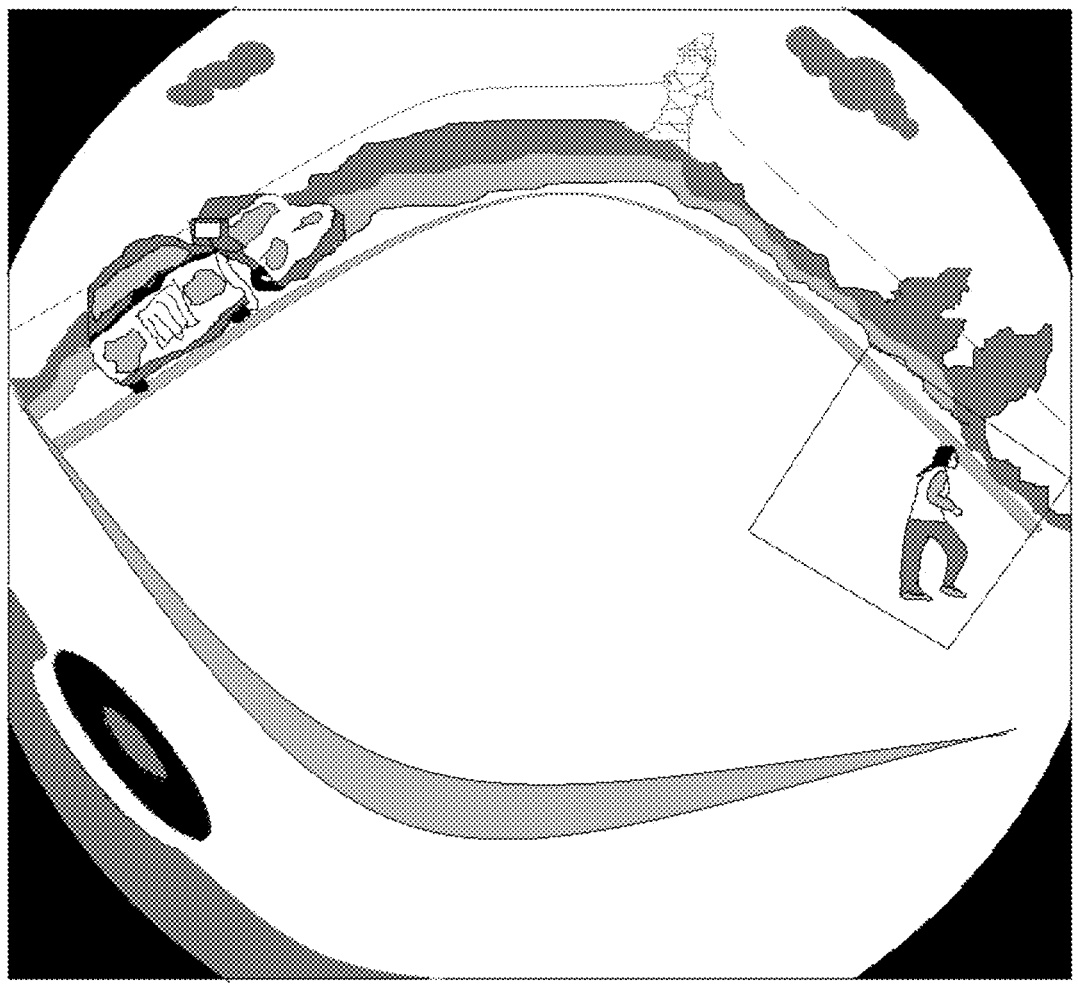
FIG. 20 is an example of a fish eye view of a vehicle vision side camera, with parts of the vehicle's body being visible at the lateral regions of the captured image.
Figure 21:
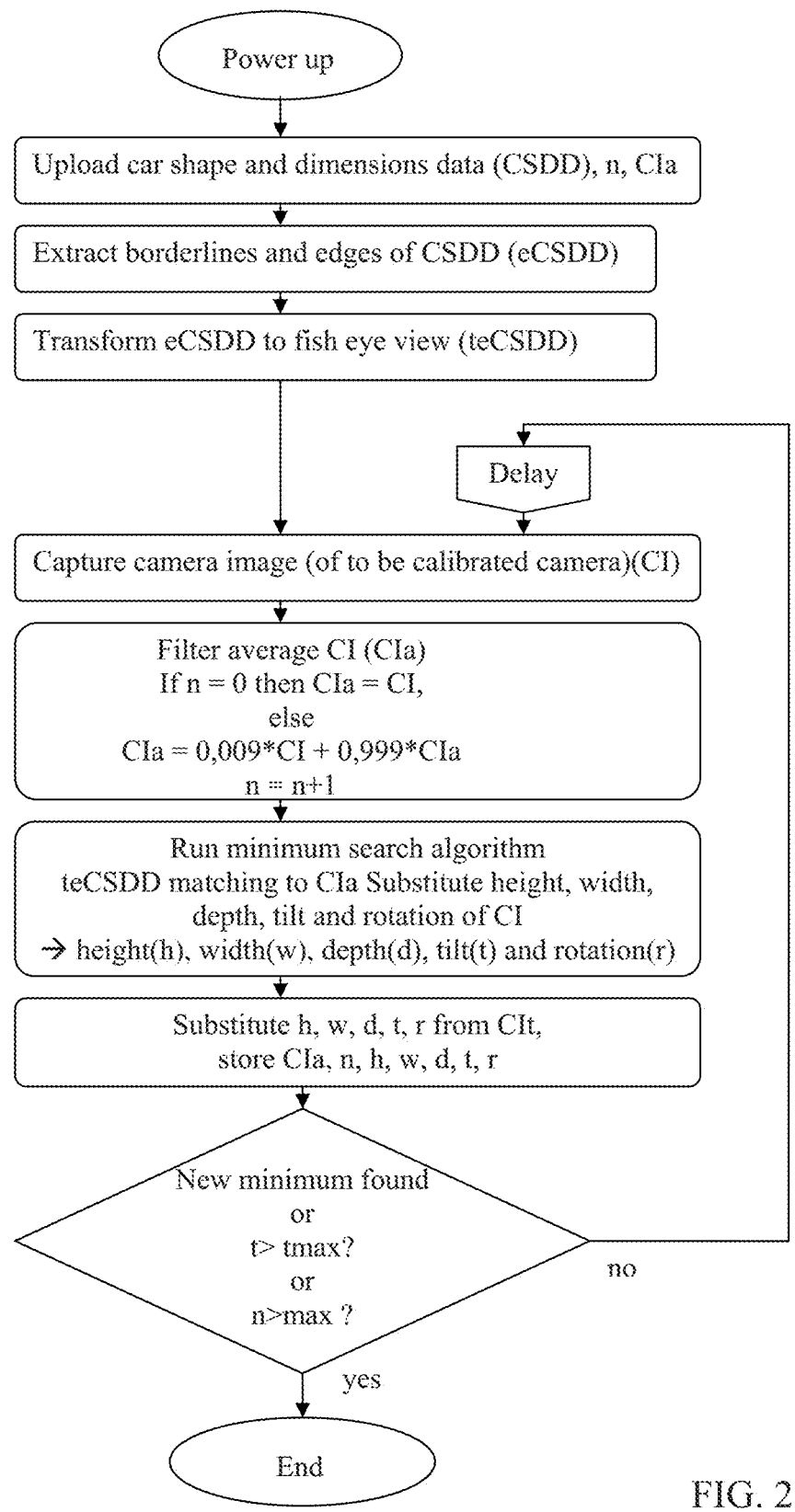
FIG. 21 is a block diagram of a camera calibration system, running an alignment algorithm of captured camera images against a transferred fish eye view of the vehicle's shape in accordance with the present invention.
Figure 22:
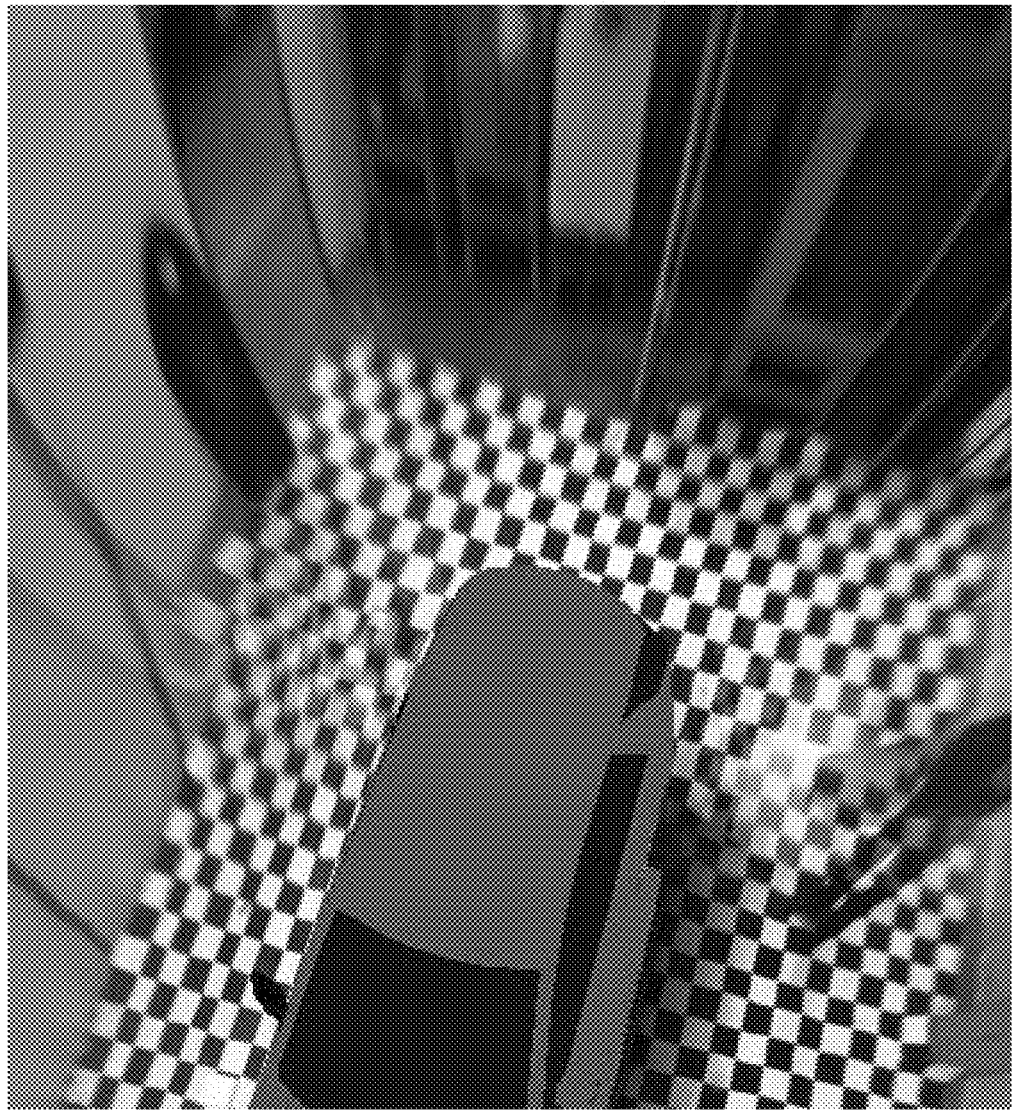
FIG. 22 is an example of a virtual top view of a vehicle.
Figure 23:
FIG. 23 is an example of a virtual top view of a vehicle's shape having the side camera's view mapped onto a three dimensional or 3D vehicle model in accordance with the present invention.
Figure 24:
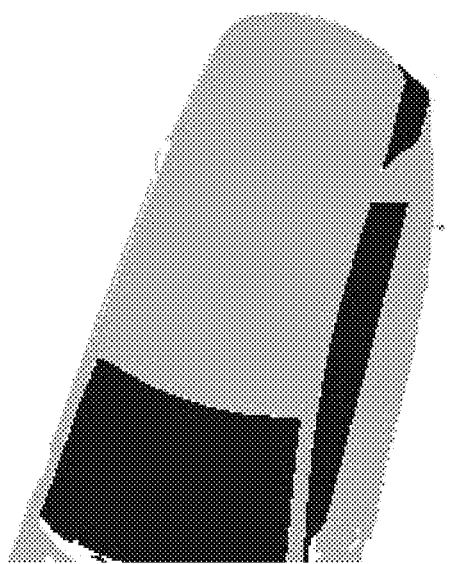
FIG. 24 is view of a 3D vehicle model as like used in FIG. 23.
Figure 25:
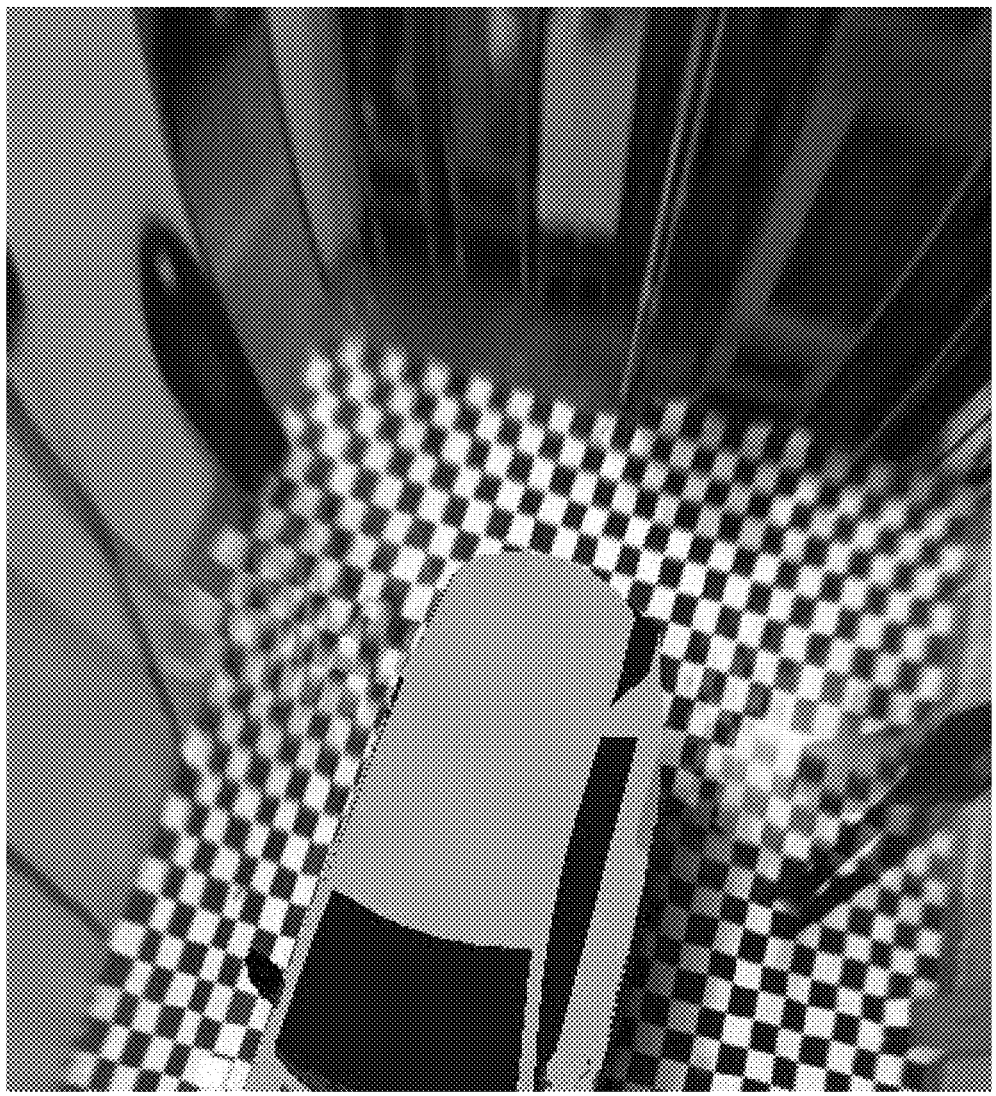
FIG. 25 is view of mapping the camera view of FIG. 23 as it is transferred and mapped onto the 3D vehicle model of FIG. 24 in accordance with the present invention.
Figure 26:
FIG. 26 is the remaining portion or piece of the difference image between the camera view of FIG. 23 when transferred and the 3D vehicle model view of FIG. 24 in accordance with the present invention.

The composed wide angle or wide view image is displayed in a manner that the images form a kind of bowl or dome. The view is as like as looking at the vision system's own vehicle from the outside, seeing the environment that the vehicle is located in. The vehicle is typically sitting at the bottom of the bowl or dome (such as shown, for example, in FIG. 20). The shown vehicle within this image may be generated by rendering a more or less naturalistic appearing vehicle more or less close to its real shape and proportions (and/or may be displayed utilizing aspects of the vision systems described above.

Figure 27:
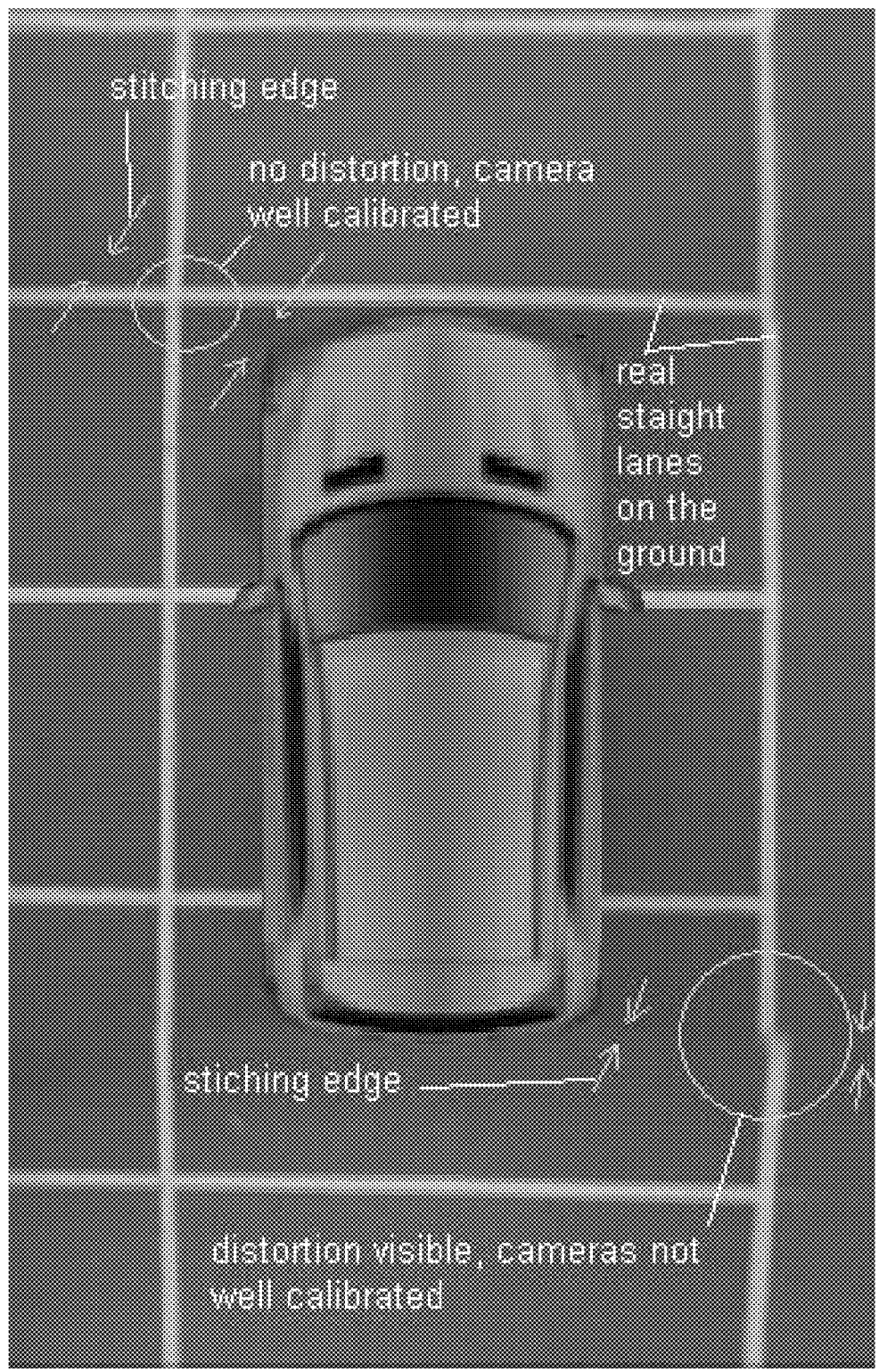
FIG. 27 is a typically top view image showing well aligned and poor aligned (right camera) vision system cameras stitched to one another.

For stitching and composing the right proportions of the above mentioned captured images from each camera to a single 360 degree view properly, it is always a task that each camera is aligned properly or within a threshold degree of alignment. There are five degrees of freedom a camera can be misaligned: height, width, depth, tilt and rotation. Another one is the focal length, but this one is usually fixed during manufacture of the camera or camera module and has a low variance. FIG. 27 shows an exemplary top view image generated by stitching images captured by front, rear, left and right cameras. Due to poor calibration, the right camera's misalignment becomes visible at the stitching lines due to breaks within straight structures crossing the views' stitching borderlines. Also, other image deformation might appear. Most are unwanted, coming from camera failures. Some cameras include specific lenses or multi lens systems used to contort the image in a desired manner. These lenses or optics may also include a variance of manufacturing which may be captured in the camera's image. In such systems, the fish eye view may be distorted into an asymmetric fish eye view or image.

It is a known method to correct camera misalignments by rotating and/or shifting the captured camera image during the image processing. Typically, this may be done by capturing a target, which has known dimensions during a calibration procedure (and such as by utilizing aspects of the vision systems described in PCT Application No. PCT/US2012/064980, filed Nov. 14, 2012, and published May 23, 2013 as International Publication No. WO 2013/074604, which is hereby incorporated herein by reference in its entirety). There may also be methods to cure or correct unwanted lens distortions during such a procedure using a target. Also, more than one misaligned camera can be calibrated with a target or targets.

Other calibration methods are targetless. These try to eliminate the misalignment over time by capturing a the natural environment, often during driving of the vehicle, using optical physics, such as the vanishing point or round shape items, and/or the like.

Calibrating cameras in a vehicle repair shop or otherwise having the need of using a target is inconvenient. It may also be error prone since it is hard for the repair shop's staff to set up the target correctly and/or to judge whether a calibration was successful. Also, such targets are inconvenient to handle and to store. Thus, it may be desired to provide a targetless calibration system for (re-)calibrating vehicle vision system cameras.

Using targetless vehicle vision system camera calibration methods, which have the need for moving the vehicle to calibrate may not be fully satisfying. It takes time and is not always successful, depending on the environment and lighting and/or weather conditions. Thus, the present invention provides a target less calibrating method without the need for doing a calibration drive or at least to limit such a calibration drive.

The vehicle's own shape and proportions are known from the OEM's construction model (CAD). Typically, this is a file of data. These or an extract of it, or data close to it can be used for generating (rendering) a virtual vehicle model as like it would be visible in a vision system (such as by utilizing aspects of the vehicle vision systems described above). Such a vehicle model may also come from a scanned vehicle (surface), such as by capturing the reflections of the vehicle in one or multiple (non-vehicle) mirrors or reflective surfaces, such as window surfaces of a building or the like, and preferably, the vehicle may turn or move until all of the vehicle side and front and rear surfaces are captured. Optionally, such a vehicle model may be generated by using a scanner device, such as a laser scanner or the like.

The vehicle's model data may become overwritten entirely or in parts over a run time, by captured image data when the camera(s) is/are not running in calibration mode, but was/were calibrated before. The corrected vehicle model may find use in the next calibration event and further on consecutively.

The vehicle's own shape and proportions from above become transformed into a single camera's fisheye view, in order to be calibrated, according the camera's and/or transformation matrix parameters. The transformation may take place in one step while capturing the vehicle's proportion and shape in the method above. The vehicle's model might be stored in natural view or may be stored in the transformed view. The vehicle's model may be provided by a vehicle device, such as, for example, the vision processing or head- or display unit, and/or a communication device that collects the according data from a remote source, such as a supplier's or OEM's server or the like.

Additionally or alternatively, the system may transfer the single camera's wide angle or fisheye view into one vehicle top view as seen from a virtual view point mapping the proportion and shape onto the according positions of the vehicle's 3D model in order to calibrate the cameras' view mapping positions, according the camera's and/or transformation matrix parameters. FIGS. 22-26 show an example in which one camera's alignment may be compared to the 3D vehicle reference.

The camera becomes calibrated by running an alignment algorithm of the body shapes captured, real view against the expected view out of the vehicle's model transformed as described above. The resulting misalignment is reflected, and thus subtracted or compensated for when stitching all of the cameras' images and composing the right proportions in the virtual 360 degree vision system view.

An approximation algorithm also comes into use. The approximation algorithm is a Newton's method. The alignment is done by a minimum quest. Not the whole vehicle body image, but filtered data of it, comes into use for the alignment algorithm. For example, the main borderlines and/or edges of the vehicle body come into use. The algorithm may use any suitable number of significant points to align, such as, for example, nine or more significant points to align.

The calibration algorithm may include several stages. For example, the calibration algorithm may find a first side-minimum initially. The camera's image for the alignment algorithm above may become composed out of several superpositioned images, and the superpositioned images may be taken over a specific time, and/or the superpositioned images may be taken in infinite time (such as a running average or the like).

The main minimum may be found in a consecutive stage when using the superposed image which was already composed at that time. The image superposition minimum search algorithm of the second stage may run in a low priority, when processing time is available. The calibration algorithm may have a routine to decide whether the found minimum is the main minimum.

Optionally, it is envisioned that non-vehicle embodied cameras may be calibrated by the calibration method of the present invention. For example, the cameras to be calibrated may comprise aftermarket cameras, mobile or entertainment device cameras, and the like, OEM-cameras added to the vehicle by the owner (after vehicle manufacture or end-of-line (EOL)).

Optionally, cameras mounted on a trailer may become incorporated into the vision system's 360 degree view and may also be calibrated by the calibration method of the present invention. The trailers dimensions and bending attributes become reflected. The trailer's attributes may be uploaded by the owner, or by a communication device or the like, or may be from the trailer manufacturer's, OEM's or vision system supplier's database or the like. The trailer's attributes may be measured in a learning mode by the vision system by circling or driving the vehicle around the de-coupled trailer. A top view on to the trailer and its rear area or region may be generated by the vision system. A specific trailer steering aid system/algorithm might come into use having rear top view and according overlays.

Therefore, the present invention provides a vision system for a vehicle that includes a processor or head unit and a camera or cameras mounted at the vehicle. The processor or head unit may be operable to merge captured images to provide a surround view or virtual view of the area at least partially at or surrounding the equipped vehicle. The present invention provides a calibration system for the vehicle vision system that calibrates the vehicle cameras without targets and/or specific calibration drives. The calibration system utilizes real vehicle images or data (such as image data representative of where a portion or portions of the equipped vehicle should be in the captured images for a properly calibrated camera) and determines a variation in captured images of the portion or portions of the equipped vehicle as compared to a database or data file of the vehicle, in order to determine a misalignment of the camera or cameras. The comparison and determination may be done while the vehicle is parked and/or being driven.

Conventional surround view/bird's-eye systems typically present for view by the driver of the vehicle a two dimensional view of what a virtual observer may see from a vantage point some distance above the vehicle and viewing downward, such as by utilizing aspects of the display systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/064980, filed Nov. 14, 2012, and published May 23, 2013 as International Publication No. WO 2013/074604, and/or PCT Application No. PCT/US2012/048993, filed Jul. 31, 2012, and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published Nov. 1, 2012 as International Publication No. WO 2012/145822, and/or U.S. Pat. No. 7,161,616, and/or U.S. patent application Ser. No. 13/333,337, filed Dec. 21, 2011, now U.S. Pat. No. 9,264,672, which are hereby incorporated herein by reference in their entireties. In this regard, the region that the vehicle occupies is also shown two dimensionally, typically as a schematic representation in two dimensions as a footprint of a vehicle representation.

In accordance with the present invention, the central or footprint region of the displayed image that the vehicle occupies and around which the real time video images are displayed, is shown by a three dimensional representation or rendering of the subject vehicle (with the three dimensional representation having an upper or top surface and one or more side surfaces of the vehicle represented in the displayed image). Thus, to take an example for illustration, an owner of a MY 2012 black colored BMW 3-series vehicle would see on the video screen, the actual subject vehicle type (where the vehicle representation generated by the system would look like a three dimensional model of, for example, a MY 2012 black colored BMW 3-series vehicle or the like). Optionally, the system may generate and the viewer may see an avatar or virtual image that, preferably, closely resembles the subject vehicle.

In accordance with the present invention, the driver or occupant of the subject vehicle may effectively maneuver or pan the viewing aspect or angle or virtual vantage point to any desired side view or viewing angle of a representation of the subject vehicle in full three dimensions (showing the top and front, rear and/or sides of the vehicle representation depending on the virtual viewing location or vantage point). When looking, for example, from a bird's-eye view and at an angle, a portion of the representation of the subject vehicle (for example, the forward left region of the vehicle representation when viewed from a virtual vantage point rearward and towards the right side of the vehicle relative to a central point above the vehicle) may shadow or obscure an object (such as a child or other object of interest) standing or present on the road and close to that particular part of the vehicle. Thus, when viewing displayed images representative of that particular viewing angle, the solid presence of that particular portion of the vehicle representation would hide or obscure the presence of that object or child.

However, in accordance with the present invention, that particular region of the vehicle representation at which the child or object is present but not viewable by the driver can be rendered transparent or can be removed or partially or substantially removed or hidden, so that the object or child so present that is being imaged by a camera of the vehicle, and that is otherwise shadowed/obscured by the solid portion of the vehicle representation due to the particular viewing angle of the virtual camera, is viewable by the driver or occupant of the vehicle that is viewing the display screen. Preferably, the portion of the vehicle representation at or adjacent the detected object or child or critical to allowing the driver to view the presence of the object or child is all that is rendered transparent or removed, while the rest of the vehicle representation is solid or "normal", so as to enable the driver to appropriately appreciate and gauge the relationship of the overall vehicle to the rest of the exterior scene that is being imaged by the multi-camera system.

The renderence of local transparency/vehicle body removal of the vehicle representation may be via user selection, where the driver may, using a cursor or other input device, select a particular portion of the displayed vehicle representation to be rendered transparent based on the driver's particular concern to ensure that there is nothing being shadowed or obscured by that portion of the vehicle representation itself. Alternatively and preferably, machine vision object detection techniques (such as by utilizing an EYEQ image processor or the like and/or external radar sensors or the like, such as by utilizing aspects of the vision systems described in U.S. Pat. Nos. 7,937,667; 8,013,780; 7,914,187; 7,038,577 and/or 7,720,580, which are hereby incorporated herein by reference in their entireties) may automatically detect the presence or possible presence of an object or person or hazardous condition and may automatically render the appropriate portion of the vehicle representation transparent, with the portion that is rendered transparent being determined based on the location of the detected object relative to the vehicle and based on the location of the virtual viewpoint or vantage point of the virtual camera.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published Jun. 6, 2013 as International Publication No. WO 2013/081985, and/or PCT Application No. PCT/US2012/066570, filed Nov. 27, 2012, and published Jun. 6, 2013 as International Publication No. WO 2013/081984, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least 640 columns and at least 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/727,912, filed Nov. 19, 2012; Ser. No. 61/718,382, filed Oct. 25, 2012; Ser. No. 61/699,498, filed Sep. 11, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012, and/or PCT Application No. PCT/US2012/066571, filed Nov. 27, 2012, and published Jun. 6, 2013 as International Publication No. WO 2013/081985, and/or PCT Application No. PCT/US2012/066570, filed Nov. 27, 2012, and published Jun. 6, 2013 as International Publication No. WO 2013/081984, and/or PCT Application No. PCT/US2012/064980, filed Nov. 14, 2012, and published May 23, 2013 as International Publication No. WO 2013/074604, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/057007, filed Sep. 25, 2012, and published Apr. 4, 2013 as International Publication No. WO 2013/048994, and/or PCT Application No. PCT/CA2012/000378, filed Apr. 25, 2012, and published Nov. 1, 2012, and WO 2012/145822, and/or PCT Application No. PCT/US2012/056014, filed Sep. 19, 2012, and published Mar. 28, 2013 as International Publication No. WO 2013/043661, and/or PCT Application No. PCT/US2012/048800, filed Jul. 30, 2012, and published Feb. 7, 2013 as International Publication No. WO 2013/019707, and/or PCT Application No. PCT/US2012/048110, filed Jul. 25, 2012, and published Jan. 31, 2013 as International Publication No. WO 2013/016409, and/or U.S. patent application Ser. No. 13/660,306, filed Oct. 25, 2012, now U.S. Pat. No. 9,146,898, and/or Ser.

No. 13/534,657, filed Jun. 27, 2012, and published Jan. 3, 2013 as U.S. Patent Publication No. US-2013-0002873, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170; and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and/or other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/064980, filed Nov. 14, 2012, and published May 23, 2013 as International Publication No. WO 2013/074604, and/or PCT Application No. PCT/US2012/048993, filed Jul. 31, 2012, and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published Nov. 1, 2012 as International Publication No. WO 2012/145822, and/or U.S. patent application Ser. No. 13/333,337, filed Dec. 21, 2011, now U.S. Pat. No. 9,264,672, and/or U.S. provisional application Ser. No. 61/588,833, filed Jan. 20, 2012, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system comprising:

a plurality of cameras disposed at a vehicle equipped with the vehicular vision system, wherein the plurality of cameras comprises a front camera having a field of view at least forward of the equipped vehicle, a rear camera having a field of view at least rearward of the equipped vehicle, a driver-side camera having a field of view at least sideward of the equipped vehicle, and a passenger-side camera having a field of view at least sideward of the equipped vehicle;

wherein the plurality of cameras comprises a plurality of CMOS cameras;

a processor operable to process image data captured by the plurality of cameras;

wherein images derived from image data captured by the at least some of the front camera; the rear camera, the driver-side camera and the passenger-side camera are displayed on a display screen of the equipped vehicle for viewing by a driver of the equipped vehicle during a driving maneuver of the equipped vehicle;

wherein, during the driving maneuver of the equipped vehicle, the display screen displays a three dimensional vehicle representation of the equipped vehicle as would be viewed from a viewpoint exterior to the equipped vehicle;

wherein a portion of the displayed three dimensional vehicle representation is at least partially transparent, and wherein a displayed region exterior of the equipped vehicle that would otherwise be partially hidden by non-transparent display of that portion of the displayed three dimensional vehicle representation is viewable at the display screen through that portion of the three dimensional vehicle representation; and wherein a degree of transparency of the portion of the displayed three dimensional vehicle representation is adjustable.

2. The vehicular vision system of claim 1, wherein the degree of transparency of the portion of the displayed three dimensional vehicle representation is adjustable responsive to determination of an object present at or near the equipped vehicle.

3. The vehicular vision system of claim 2, wherein the portion of the displayed three dimensional vehicle representation that is at least partially transparent includes the object.

4. The vehicular vision system of claim 3, wherein the degree of transparency of the portion of the displayed three dimensional vehicle representation is increased so the portion of the displayed three dimensional vehicle representation does not obscure displayed images of the object.

5. The vehicular vision system of claim 2, wherein the degree of transparency of the portion of the displayed three dimensional vehicle representation is adjustable responsive to location of the object at or near the equipped vehicle.

6. The vehicular vision system of claim 2, wherein the object is determined to be present at or near the equipped vehicle via a radar sensor disposed at the equipped vehicle.

7. The vehicular vision system of claim 2, wherein the object is determined to be present at or near the equipped vehicle via processing at the processor of captured image data.

8. The vehicular vision system of claim 1, wherein the degree of transparency of the portion of the displayed three dimensional vehicle representation is adjustable based at least in part on a level of backlight.

9. The vehicular vision system of claim 1, wherein the degree of transparency of the portion of the displayed three dimensional vehicle representation is adjustable based at least in part on distance from the equipped vehicle to the viewpoint.

10. The vehicular vision system of claim 1, wherein the degree of transparency of the portion of the displayed three dimensional vehicle representation is adjustable based at least in part on an aberration angle of the equipped vehicle from a viewing direction of the viewpoint.

11. The vehicular vision system of claim 1, wherein the displayed images are representative of an environment at least partially surrounding the equipped vehicle.

12. The vehicular vision system of claim 1, wherein the viewpoint is exterior to and higher than the equipped vehicle itself.

13. The vehicular vision system of claim 1, wherein the processor processes image data captured by at least some of the front camera, the rear camera, the driver-side camera and the passenger-side camera to generate the images for display at the display screen.

14. The vehicular vision system of claim 1, wherein the processor generates the three dimensional vehicle representation.

15. A vehicular vision system comprising:
a plurality of cameras disposed at a vehicle equipped with the vehicular vision system, wherein the plurality of cameras comprises a front camera having a field of view at least forward of the equipped vehicle, a rear camera having a field of view at least rearward of the equipped vehicle, a driver-side camera having a field of view at least sideward of the equipped vehicle, and a passenger-side camera having a field of view at least sideward of the equipped vehicle;
wherein the plurality of cameras comprises a plurality of CMOS cameras;
a processor operable to process image data captured by the plurality of cameras;
wherein images derived from image data captured by the at least some of the front camera, the rear camera, the driver-side camera and the passenger-side camera are displayed on a display screen of the equipped vehicle for viewing by a driver of the equipped vehicle during a driving maneuver of the equipped vehicle;
wherein, during the driving maneuver of the equipped vehicle, the display screen displays a three dimensional vehicle representation of the equipped vehicle as would be viewed from a viewpoint exterior to the equipped vehicle;
wherein a portion of the displayed three dimensional vehicle representation is at least partially transparent;
wherein a displayed region exterior of the equipped vehicle that would otherwise be partially hidden by non-transparent display of that portion of the displayed three dimensional vehicle representation is viewable at the display screen through that portion of the three dimensional vehicle representation;
wherein a degree of transparency of the portion of the displayed three dimensional vehicle representation is adjustable, and wherein the degree of transparency is based on a level of backlight;
wherein the degree of transparency of the portion of the displayed three dimensional vehicle representation is adjustable responsive to determination of an object present at or near the equipped vehicle; and
wherein the portion of the displayed three dimensional vehicle representation that is at least partially transparent includes the object.

16. The vehicular vision system of claim 15, wherein the degree of transparency of the portion of the displayed three dimensional vehicle representation is increased so the portion of the displayed three dimensional vehicle representation does not obscure displayed images of the object.

17. The vehicular vision system of claim 15, wherein the degree of transparency of the portion of the displayed three dimensional vehicle representation is adjustable responsive to location of the object at or near the equipped vehicle.

18. The vehicular vision system of claim 15, wherein the object is determined to be present at or near the equipped vehicle via a radar sensor disposed at the equipped vehicle.

19. The vehicular vision system of claim 15, wherein the object is determined to be present at or near the equipped vehicle via processing at the processor of captured image data.

20. A vehicular vision system comprising:
a plurality of cameras disposed at a vehicle equipped with the vehicular vision system, wherein the plurality of cameras comprises a front camera having a field of view at least forward of the equipped vehicle, a rear camera having a field of view at least rearward of the equipped vehicle, a driver-side camera having a field of view at least sideward of the equipped vehicle, and a passenger-side camera having a field of view at least sideward of the equipped vehicle;
wherein the plurality of cameras comprises a plurality of CMOS cameras;
a processor operable to process image data captured by the plurality of cameras;
wherein images derived from image data captured by the at least some of the front camera; the rear camera, the driver-side camera and the passenger-side camera are displayed on a display screen of the equipped vehicle for viewing by a driver of the equipped vehicle during a driving maneuver of the equipped vehicle;

wherein the displayed images are representative of an environment at least partially surrounding the equipped vehicle;

wherein, during the driving maneuver of the equipped vehicle, the display screen displays a three dimensional vehicle representation of the equipped vehicle as would be viewed from a viewpoint exterior to the equipped vehicle;

wherein the viewpoint is exterior to and higher than the equipped vehicle itself;

wherein a portion of the displayed three dimensional vehicle representation is at least partially transparent;

wherein a displayed region exterior of the equipped vehicle that would otherwise be partially hidden by non-transparent display of that portion of the displayed three dimensional vehicle representation is viewable at the display screen through that portion of the three dimensional vehicle representation; and wherein a degree of transparency of the portion of the displayed three dimensional vehicle representation is adjustable.

21. The vehicular vision system of claim 20, wherein the degree of transparency of the portion of the displayed three dimensional vehicle, representation is adjustable based at least in part on a level of backlight.

22. The vehicular vision system of claim 20, wherein the degree of transparency of the portion of the displayed three dimensional vehicle representation is adjustable based at least in part on distance from the equipped vehicle to the viewpoint.

23. The vehicular vision system of claim 20, wherein the degree of transparency of the portion of the displayed three dimensional vehicle representation is adjustable based at least in part on an aberration angle of the equipped vehicle from a viewing direction of the viewpoint.

* * * * *